United States Patent
Brusberg et al.

(10) Patent No.: US 11,105,981 B2
(45) Date of Patent: Aug. 31, 2021

(54) OPTICAL CONNECTORS AND DETACHABLE OPTICAL CONNECTOR ASSEMBLIES FOR OPTICAL CHIPS

(71) Applicant: Alliance Fiber Optic Products, Inc., Sunnyvale, CA (US)

(72) Inventors: Lars Martin Otfried Brusberg, Corning, NY (US); Ximao Feng, San Mateo, CA (US); Wen-Lung Kuang, Taoyuan (TW)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 16/434,243

(22) Filed: Jun. 7, 2019

(65) Prior Publication Data

US 2019/0384005 A1 Dec. 19, 2019

Related U.S. Application Data

(60) Provisional application No. 62/686,291, filed on Jun. 18, 2018.

(51) Int. Cl.
*G02B 6/30* (2006.01)
*G02B 6/26* (2006.01)
*G02B 6/38* (2006.01)

(52) U.S. Cl.
CPC .......... *G02B 6/30* (2013.01); *G02B 6/26* (2013.01); *G02B 6/262* (2013.01); *G02B 6/3846* (2013.01)

(58) Field of Classification Search
CPC ...... G02B 6/26; G02B 6/3846; G02B 6/3885; G02B 6/3897; G02B 6/122; G02B 6/135;
(Continued)

(56) References Cited

U.S. PATENT DOCUMENTS 6,767,141 B1  7/2004 Dudek et al.
7,366,380 B1  4/2008 Peterson et al.
(Continued)

FOREIGN PATENT DOCUMENTS

DE  3902574 A1  8/1990
JP  2013-029624 A  2/2013
(Continued)

OTHER PUBLICATIONS

International Search Report and Written Opinion of the European International Searching Authority; PCT/US2019/035754; dated Sep. 13, 2019; 13 Pgs.

*Primary Examiner* — Michael P Mooney
(74) *Attorney, Agent, or Firm* — Grant A. Gildehaus

(57) ABSTRACT

Detachable optical connectors for optical chips and methods of their fabrication are disclosed. In one embodiment, an optical connector includes a ferrule that supports ferrule waveguides. The optical connector further includes a waveguide support coupled to the ferrule and that supports transition waveguides that are optically coupled to the ferrule waveguides. Ends of the ferrule waveguides are exposed at one end of the ferrule to define a first pitch while ends of the second waveguides are exposed at a chip coupling surface of the waveguide support. The transition waveguides provide at least one type of transition for the guided light traveling within the ferrule waveguides to enable either edge coupling, surface coupling or evanescent coupling to chip waveguides of an optical chip. The transition can include a change in mode-field diameter, direction of the guided light, and/or pitch.

20 Claims, 19 Drawing Sheets

(58) Field of Classification Search
CPC ...... G02B 6/30; G02B 6/3883; G02B 6/3893; G02B 6/403; G02B 6/421; G02B 6/4292
USPC ............................ 385/31, 39, 49–51, 78–87
See application file for complete search history.

(56) References Cited

U.S. PATENT DOCUMENTS

| | | |
|---|---|---|
| 9,250,397 B2 | 2/2016 | Akabane et al. |
| 9,261,656 B2 | 2/2016 | Qi et al. |
| 9,389,362 B1 * | 7/2016 | Brunschwiler .... G02B 6/12004 |
| 9,933,574 B1 * | 4/2018 | Zhang .................. G02B 6/4214 |
| 2014/0105612 A1 | 4/2014 | Wu et al. |
| 2014/0301700 A1 | 10/2014 | Matsubara et al. |
| 2015/0037044 A1 | 2/2015 | Peterson et al. |
| 2015/0166395 A1 | 6/2015 | Marjanovic et al. |
| 2015/0198773 A1 | 7/2015 | Nakama et al. |
| 2015/0355419 A1 | 12/2015 | Isenhour et al. |
| 2016/0062066 A1 | 3/2016 | Lee et al. |
| 2016/0116695 A1 | 4/2016 | Nekado et al. |
| 2016/0216459 A1 | 7/2016 | Matsubara et al. |
| 2017/0052317 A1 | 2/2017 | Mahgerefteh et al. |
| 2017/0176684 A1 | 6/2017 | Miller |
| 2019/0094460 A1 | 3/2019 | Brusberg et al. |

FOREIGN PATENT DOCUMENTS

| | | |
|---|---|---|
| WO | 1997034176 A1 | 9/1997 |
| WO | 2018165002 A1 | 9/2018 |
| WO | 2018165061 A1 | 9/2018 |

* cited by examiner

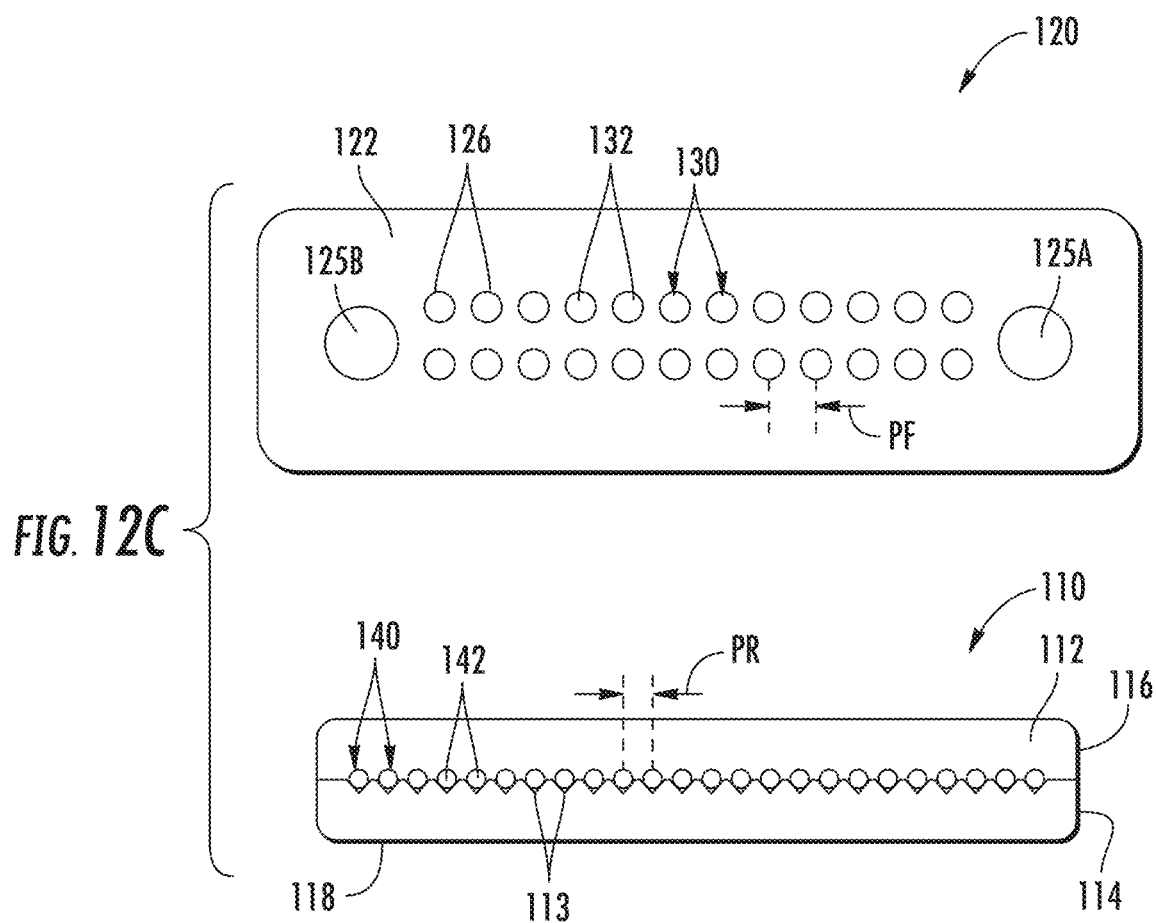

OPTICAL CONNECTORS AND DETACHABLE OPTICAL CONNECTOR ASSEMBLIES FOR OPTICAL CHIPS

PRIORITY APPLICATION

This application claims the benefit of priority of U.S. Provisional Application No. 62/686,291, filed on Jun. 18, 2018, the content of which is relied upon and incorporated herein by reference in its entirety.

FIELD

The present disclosure generally relates to optical communication and, more particularly, to optical connectors and detachable optical connector assemblies for optical chips.

BACKGROUND

Benefits of optical fiber include extremely wide bandwidth and low noise operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device. The respective optical connectors of the optical cable assembly and the electronic device define an optical connector assembly.

In silicon-based photonic devices, such as hybrid-silicon lasers and silicon optical modulators, optical signals are propagated through an optical chip within optical waveguides. In some laser devices, the laser signals exit the device through a side facet such that the laser signal does not turn prior to being emitted. The alignment of the waveguides at the side facet to optical fibers requires an expensive and time consuming active alignment process. Such active alignment processes add significant costs, and severely reduces throughput. Further, present methods permanently affix the optical fibers to the optical chip.

The optical waveguides of the optical chip typically have a much small pitch than the optical fibers to which the optical waveguides are optical coupled. Furthermore, the optical waveguides of the optical chip can have different configurations that in turn require different coupling configurations. Thus, the optical connector on the optical chip side of an optical connector assembly needs to be configured to accommodate the given optical waveguide configuration of the optical chip. This has made it very challenging to form optical connector assemblies that have the required connection configuration on the optical chip side while also providing for a detachable optical connection to a standard configuration of optical fibers of an optical cable assembly.

SUMMARY

Embodiments of the present disclosure are directed to optical connector assemblies that provide for detachable optical connections at an optical chip, such as a passive light wave circuit or an active optical chip providing active optical components such as laser diodes, modulators, multiplexers, and/or photodiodes. Embodiments provide an optical connector ("receptacle connector") at an optical chip that allows for repeatable mating and demating of another cooperating optical connector ("plug connector") to the receptacle connector attached to the optical chip.

The receptacle connector is configured to receive guided light from one or more optical fibers from an optical fiber cable assembly and process the guided light using first and second optically coupled waveguides in a manner that allows for efficient optical coupling between the optical fibers and the optical waveguides ("chip waveguides") of the optical chip. The processing of the guided light by the receptacle connector can include at least one of changing the direction of the guided light (in-plane and/or out-of-plane) and changing the mode-field diameter of the guided light. In an example, the receptacle connector is configured to change the waveguide pitch from one end of the receptacle connector to the other, e.g., from 250 microns at one side (i.e., the optical fiber cable side) to 127 microns or smaller at the other side (i.e., the optical chip side).

Examples of the receptacle connector include configurations for performing either edge coupling, surface coupling (e.g., via a coupling grating) or evanescent coupling, which are the three main coupling configurations that define corresponding three main types of optical ports (interfaces). The waveguide materials for the chip waveguides of an optical chip can include silica, silicon-nitride, glass, polymer, silicon, or III-V materials, so that the optical chip interfaces may not be well matched to standard single mode optical fibers, such as Corning® SMF-28® optical fiber.

An embodiment of the disclosure is an optical connector comprising: a ferrule that comprises a first surface and a second surface, and a plurality of bores extending from the first surface; a waveguide support coupled to the ferrule, the waveguide support comprising a chip coupling surface; a plurality of first waveguides disposed within respective bores of the ferrule and wherein first ends of the plurality of first waveguides are exposed at the first surface of the ferrule and define a first pitch; and a plurality second waveguides respectively optically coupled to the second ends of the first waveguides, with the second waveguides at least partially supported by waveguide support with ends of the second waveguides exposed at the chip coupling surface of the waveguide support and defining a second pitch that is same as or smaller than the first pitch.

Another embodiment of the disclosure is an optical assembly, comprising: an optical chip comprising a surface, an edge, and a plurality of chip waveguides proximate the surface and terminating at the edge; and an optical connector that comprises: a ferrule comprising a first surface and a second surface and a plurality of bores extending from the first surface; a waveguide support coupled to the ferrule, the waveguide support comprising a chip coupling surface; a plurality of first waveguides respectively disposed within the plurality of bores such that first ends of the plurality of first waveguides are exposed at the first surface of the ferrule; a plurality of second waveguides at least partially supported by the waveguide support and respectively optically coupled to the plurality of first waveguides, with ends of the plurality of the second waveguides exposed at the chip coupling surface of the waveguide support; and wherein the chip coupling surface of the waveguide support is operably disposed relative to the optical chip such that the plurality of second waveguides is optically coupled to the plurality of chip waveguides. In various example, the optical coupling can include edge coupling, surface coupling or evanescent coupling.

Another embodiment of the disclosure is an optical connector, comprising: a ferrule comprising a first surface; a waveguide support coupled to the ferrule, the waveguide support comprising a chip coupling surface; at least one first waveguide having a first MFD and operably supported by the ferrule with a first end of the at least one first waveguide exposed at the first surface of the ferrule; at least one second waveguide having a second MFD and optically coupled to a second end of the at least one first waveguide, with the at least one second waveguide supported by the waveguide support so that an end of the at least one second waveguide is exposed at the chip coupling surface of the waveguide support; and wherein the first MFD is larger than the second MFD.

Another embodiment of the disclosure is an optical connector, comprising: a ferrule that comprises a first surface and a second surface, and at least one bore extending from the first surface and that resides in a first plane; a waveguide support coupled to the ferrule, the waveguide support comprising a chip coupling surface and a bending feature; and at least one waveguide having respective first and second ends and disposed within the at least one bore of the ferrule to reside in the first plane therein and with the first ends residing at the first surface of the ferrule, the at least one waveguide extending into the waveguide support and to the bending feature such that the at least one waveguide includes an out-of-plane bend with respect to the first plane such that the second end of the at least one waveguide resides at a surface of the waveguide support that is substantially parallel to the first plane and that defines the chip coupling surface.

Another embodiment of the disclosure is an optical connector comprising: a ferrule that comprises: a first surface and a second surface, and at least one bore extending from the first surface and that resides in a first plane; a waveguide support coupled to the ferrule, the waveguide support comprising a chip coupling surface; and at least one exposed-core optical fiber having a glass-portion surface and supported by the waveguide support such that the glass-portion surface is available for evanescent optical coupling.

Other aspects of the disclosure include the one or more of the optical connectors described above operably attached to an optical chip to define an optical assembly, wherein the optical coupling between the optical connector and the optical chip can be either edge coupling, surface coupling or evanescent coupling.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description explain the principles and operation of the various embodiments.

BRIEF DESCRIPTION OF THE DRAWINGS

FIG. 12C shows respective end-on views of the first surface of the ferrule and the chip coupling surface of the waveguide support, illustrating an embodiment where two rows of twelve ferrule waveguides in each row and at a conventional ferrule pitch can be transformed into a single row of twenty-four transition waveguides having a receptacle pitch smaller than the ferrule pitch;

DETAILED DESCRIPTION

Figure 1A:
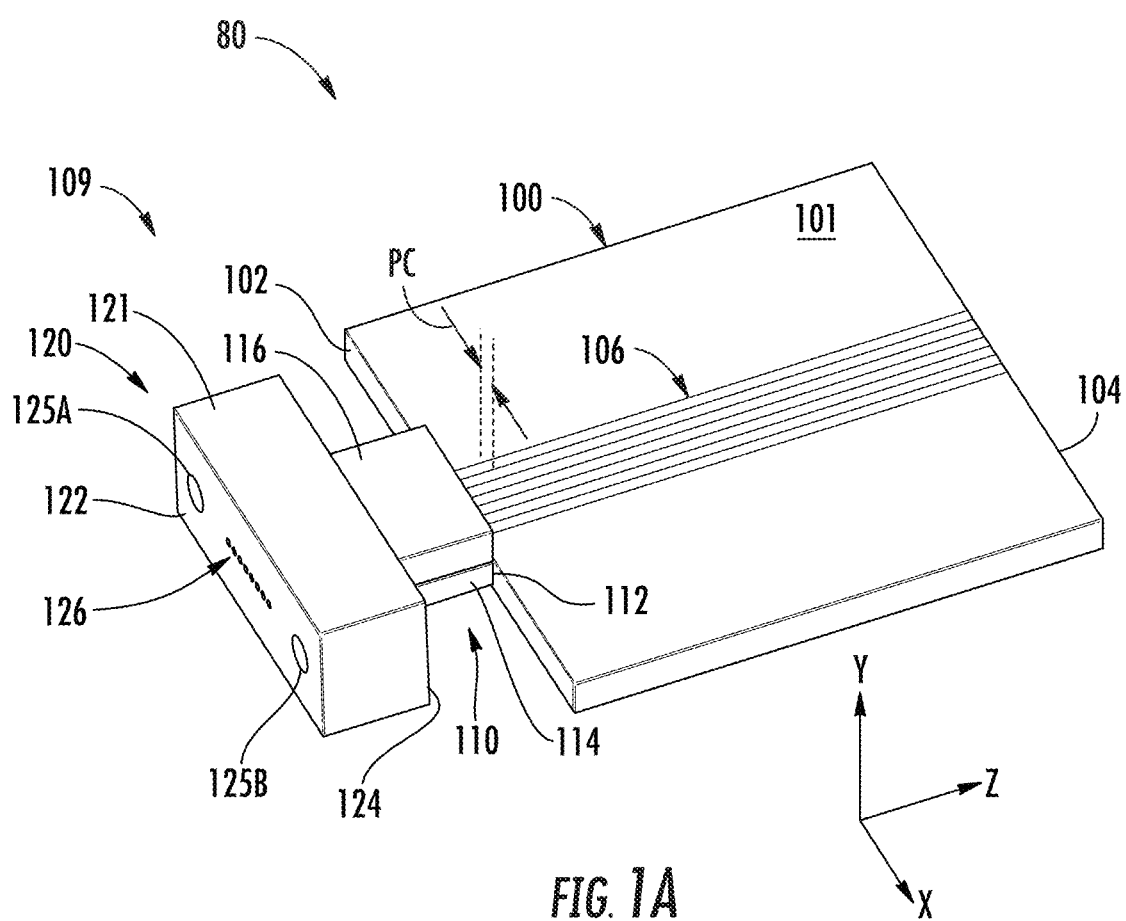
FIG. 1A schematically depicts an isometric view of an example optical assembly including a receptacle connector and an optical chip according to one or more embodiments described and illustrated herein.

Embodiments described herein are directed to optical connector assemblies that provide for detachable optical connections at an optical chip that includes a receptacle connector. The optical chip can comprise a passive light wave circuit or can additionally comprise active optical components such as laser diodes and/or photodiodes. As used herein, the term "optical chip" means any component having optical waveguides.

In the discussion below, the mode-field diameter (MFD) of the optical waveguides discussed below is determined by the Petermann II method, as is known in the art.

In the discussion below, the terms "receptacle connector" and "plug connector" are used to describe example types of optical connectors. The optical connector that is attached to the optical chip is described below as a receptacle connector for ease of discussion. The described receptacle connector can also be configured as a plug connector simply by changing the alignment bores with alignment pins.

Embodiments provide a first optical connector (e.g., a receptacle connector) at an optical chip that allows for repeatable mating and demating of a second optical connector (e.g., a plug connector) to the first optical connector at the optical chip. Because of this detachable optical connection, an optical assembly that includes the optical chip may be tested prior to final assembly and thus prior to any solder reflow processes. After testing the optical chip and/or the optical assembly with the plug connector connected to the receptacle connector, subsequent solder reflow or other bonding processes, may be performed. Following the final assembly of the optical assembly, the plug connector may be re-connected to the receptacle connector to form a connector assembly.

In the embodiments described herein, the optical connector at the optical chip may be permanently bonded to a surface of the optical chip. The optical connector at the optical chip can comprise a ferrule that includes one or more first waveguides within a ferrule ("ferrule waveguides") and can also comprise a waveguide support that includes one or more second waveguides ("transition waveguides") that are optically coupled to the ferrule waveguides and that are aligned to waveguides of the optical chip ("chip waveguides"). The transition waveguides are configured to provide at least one type of transition of the guided light traveling within the ferrule waveguides. In one example, the transition is a change in the mode-field diameter. In another example, the transition is a change in the direction of the guided light, such as an in-plane turn (bend) or an out-of-plane turn (bend). In another example involving multiple ferrule waveguides and multiple transition waveguides, the transition is a change in pitch between the ferrule waveguides and the transition waveguides so that the guided light collectively undergoes a change in pitch from one end of the optical connector to the other.

In the discussion below, in some embodiments the description refers to single ferrule waveguides and single transition waveguides while in other examples the description refers to multiple ferrule waveguides and multiple transition waveguides. Such references are not intended to be limiting as to the number of ferrule and transition waveguides that can be employed in each example embodiment.

In an example, the coefficient of thermal expansion (CTE) mismatch at higher operation temperatures up to 110° C. between conventional polymer based mechanical transfer (MT) ferrules and glass or silicon of an optical chip may misalign the waveguides at the interface area dependent on temperature. Such misalignment may add additional coupling loss. Embodiments of the present disclosure addresses CTE mismatch between a polymer based MT ferrule and glass or silicon material by incorporating a glass component into the ferrule. The CTE of the glass is matched to the CTE of silicon to avoid misalignment due to CTE mismatch.

Receptacle Connector

Figure 1B:
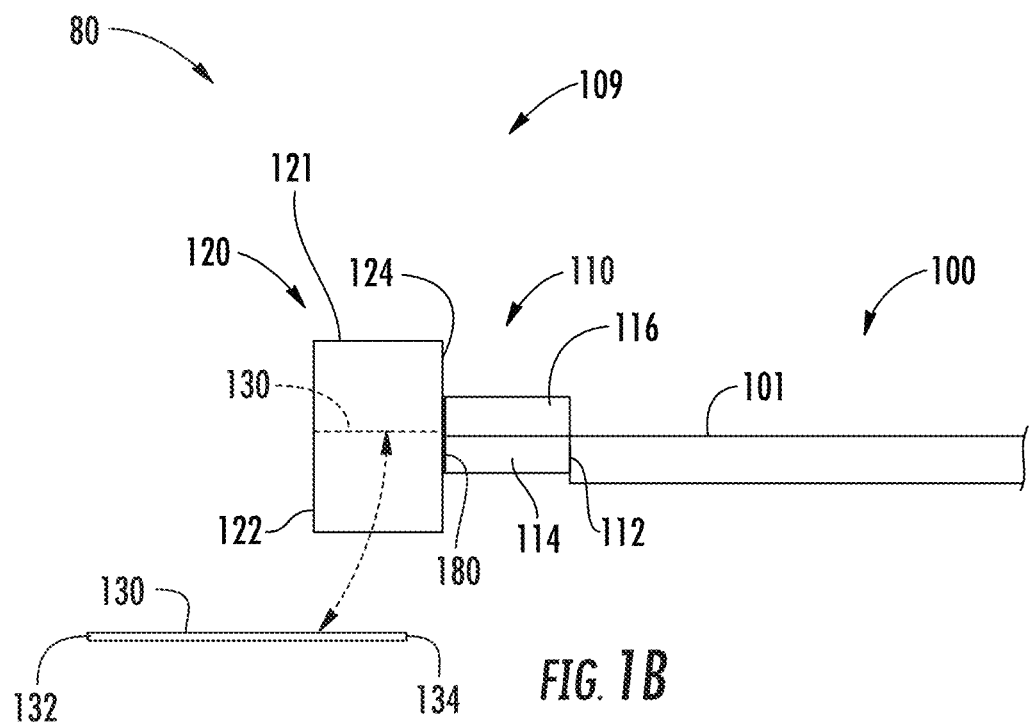
FIG. 1B schematically depicts a side view of the example optical assembly depicted in FIG. 1A according to one or more embodiments described and illustrated herein.

Referring now to FIGS. 1A and 1B, an example optical assembly 80 for use in optical communications applications is schematically depicted. FIG. 1A schematically depicts an isometric view of the example optical assembly 80, while FIG. 1B schematically depicts a side view of the example optical assembly depicted in FIG. 1A. Generally, the optical assembly 80 comprises an optical chip 100 and an optical connector 109, shown by way of example in the form of a receptacle connector, and which is referred to hereinafter as the "receptacle connector" for ease of discussion. The receptacle connector 109 is operably coupled (e.g., attached, secured, etc.) to an edge 102 of the optical chip 100. The optical chip 100 may be further mounted on a base substrate (not shown), such as a circuit board, for example. In some embodiments, the base substrate may be configured as a daughter board operable to be coupled to a motherboard or, in other embodiments, the base substrate may be configured as a motherboard.

As an example and not a limitation, the optical chip 100 may be configured as an optical communications component capable of passing optical signals. As shown in FIG. 1A, the optical chip 100 has one or more chip waveguides 106 proximate a surface 101 and that terminate at a first edge 102. The one or more chip waveguides 106 are optical waveguides capable of guiding optical signals propagating therein. In the example shown in FIG. 1A, the one or more chip waveguides 106 extend from the first edge 102 to a second edge 104. The center-to-center spacing of the chip waveguides at the first edge 102 define a pitch PC, referred to hereinafter as the optical chip pitch.

In one example, the second edge 104 is coupled to an additional active optical chip (not shown) that includes one or more active optical components (not shown) capable of transmitting (e.g., using laser diodes) and/or receiving (e.g., using photodetectors) optical signals. In such embodiments, optical signals are passed between the one or more chip waveguides 106 and the active optical components of the active optical chip. In other embodiments, the active optical components are provided directly on the optical chip 100 without the use of an additional active optical chip. The optical assembly 80 may further include additional drive circuitry (not shown) to control the active optical components to effectuate the conversion of optical signals into electrical signals and vice-versa.

The optical chip 100 may be fabricated from any material capable of having optical waveguides disposed thereon or therein. As non-limiting examples, the optical chip 100 may be fabricated from a glass-based material (e.g., glass, glass-ceramic, and fused silica) or a semiconductor material (e.g., silicon). The chip waveguides 106 may be configured as any known or yet-to-be-developed optical waveguides. Non-limiting example optical waveguides include thin-film deposition, photolithographic masking and etching processes, laser written waveguides, ion-exchanged waveguides, among others. It should be understood that the one or more chip waveguides 106 may be suitably configured for the operations of the optical chip 100 and are merely schematically depicted in a straight-line configuration.

In the example depicted in FIGS. 1A and 1B, the optical chip 100 comprises eight chip waveguides 106 proximate an upper surface 101 that terminate at the first edge 102. Any number of chip waveguides 106 may be provided. Each chip waveguide 106 may be configured to send and/or receive optical signals to/from active optical components. In one example, the optical signals may be wavelength-multiplexed, e.g., each chip waveguide 106 may propagate optical signals at, without limitation, four wavelengths.

The example optical assembly 80 depicted in FIGS. 1A and 1B comprises a receptacle connector 109 operable to optically couple optical fibers from a mated optical connector (e.g., a plug connector 250, introduced and discussed below) to the chip waveguides 106, as discussed below. As used herein, the term "optically coupled" means that that optical signals may pass between two components. In the example depicted in FIGS. 1A and 1B, the receptacle connector 109 is configured to receive and cooperate with the aforementioned mated plug connector 250 (see FIG. 18), thereby making an optical connection with the optical chip 100 and defining a connector assembly.

In the illustrated example, the receptacle connector 109 comprises a ferrule 120 having a ferrule body 121, a first surface 122, and a second surface 124. The example receptacle connector 109 further comprises a waveguide support 110 operably coupled to the ferrule 120. In some embodiments, the waveguide support 110 extends from the second surface 124 of the ferrule 120. The waveguide support 110 may comprise a first end 112, which in an example constitutes a chip coupling surface (and in such case, is also referred to as 112) for cooperating with the optical chip 100 for optical coupling. The waveguide support 110 also includes a second end 115 opposite the first end 112. The waveguide support 110 also includes a bottom surface 118, which also can constitute a chip coupling surface (and in such case, is also referred to as chip coupling surface 118). The ferrule body 121 may also comprise one or more alignment bores 125A, 125B for aligning and mating a complementary optical connector thereto. In the example of FIG. 1B, the second end 115 of waveguide support 110 is attached to the second surfaced 124 of the ferrule 120 using an adhesive 180. As noted above, the alignment bores 125A, 125B could be replaced with alignment pins to make turn the receptacle configuration into a plug configuration.

Figure 2:
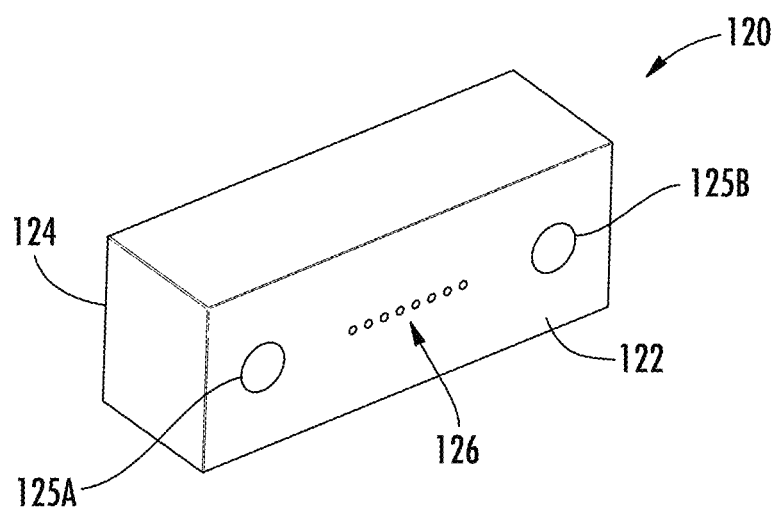
FIG. 2 schematically depicts a front isometric view of an example ferrule of an example optical connector according to one or more embodiments described and illustrated herein.
Figure 3:
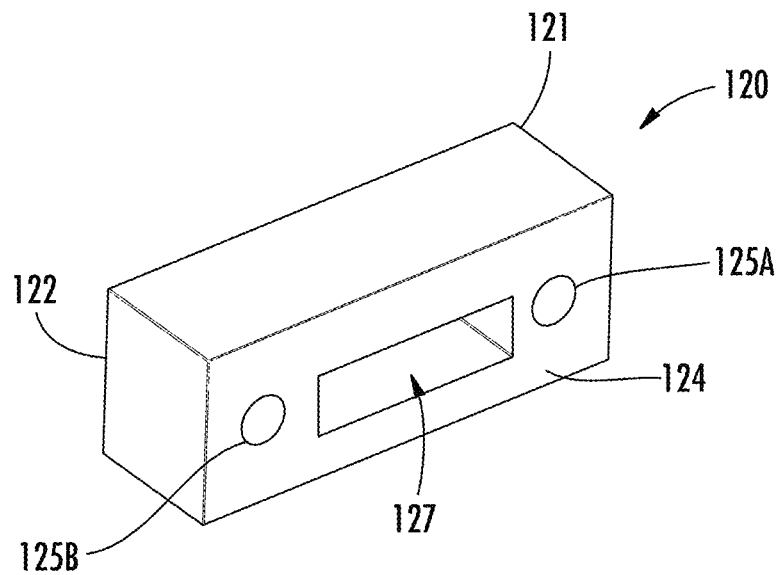
FIG. 3 schematically depicts a rear isometric view of the example ferrule depicted in FIG. 2 according to one or more embodiments described and illustrated herein.
Figure 4:
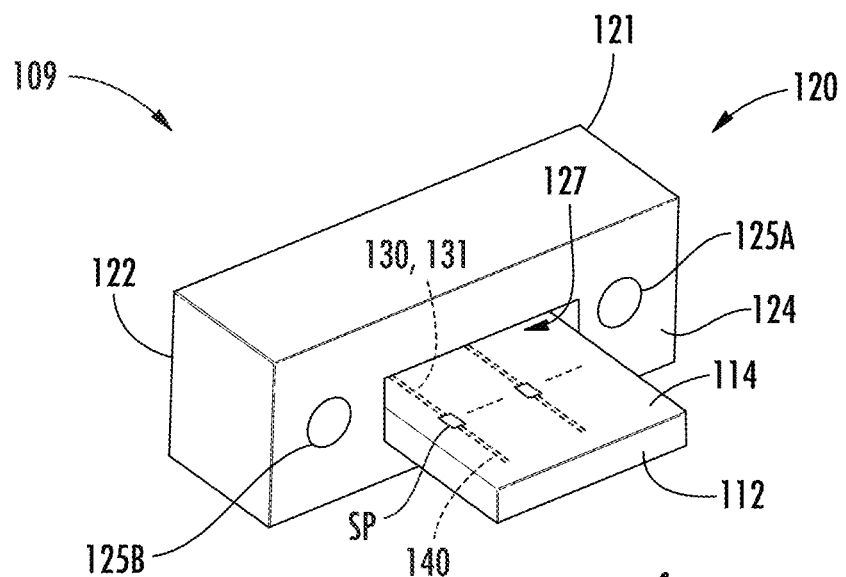
FIG. 4 schematically depicts a rear isometric view of the example ferrule depicted in FIG. 2 with a support portion of a waveguide support according to one or more embodiments described and illustrated herein.
Figure 5:
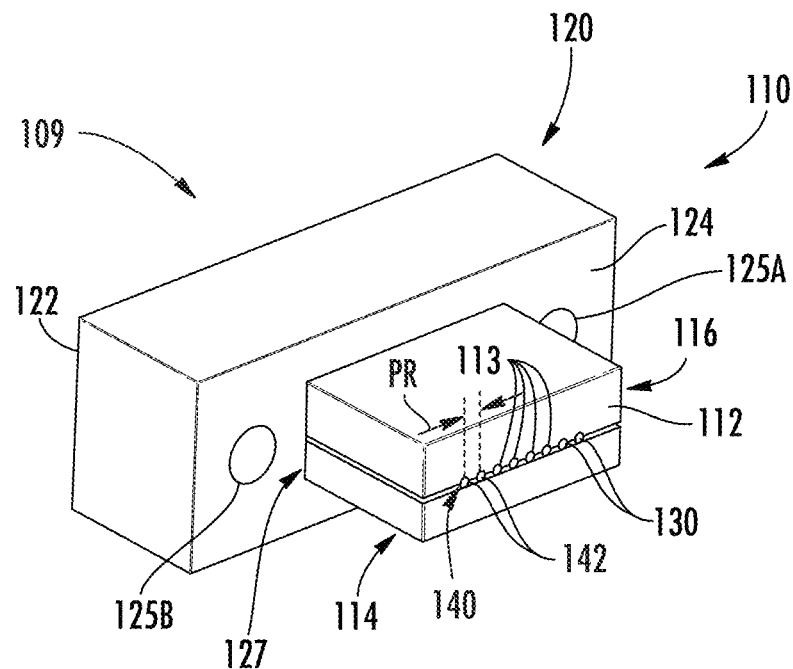
FIG. 5 schematically depicts a rear isometric view of the receptacle connector depicted in FIGS. 1A and 1B according to one or more embodiments described and illustrated herein.
Figure 6:
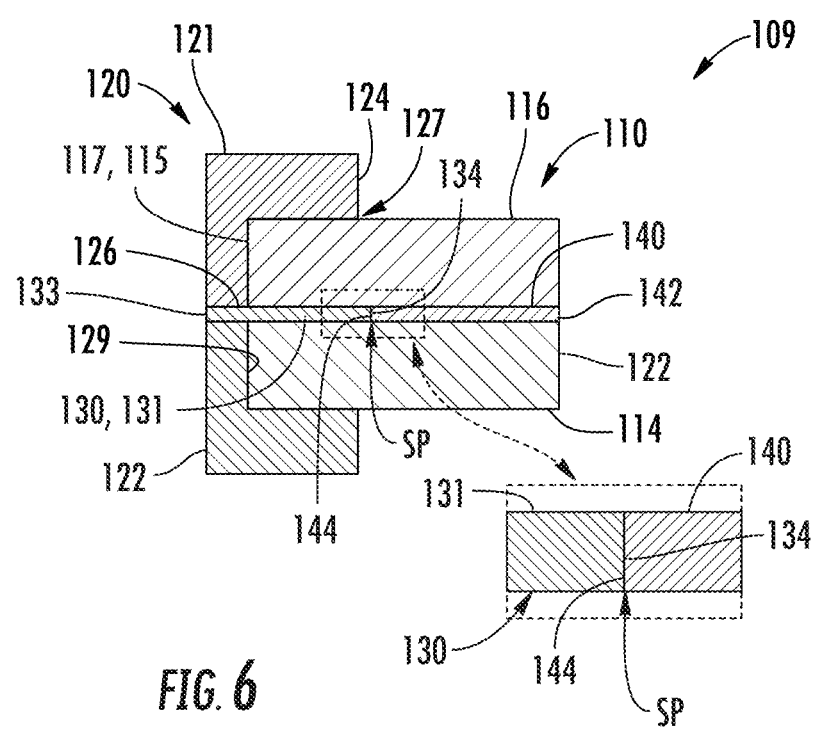
FIG. 6 schematically depicts a cross-sectional view of the receptacle connector depicted in FIGS. 1A and 1B according to one or more embodiments described and illustrated herein, and includes a close-up inset showing a splice between a ferrule waveguide and a transition waveguide.

FIGS. 2-6 schematically illustrate additional related views of the receptacle connector 109 depicted in FIGS. 1A and 1B. FIG. 2 is a front isometric view of the example ferrule 120, and FIG. 3 is a rear isometric view of the example ferrule 120. FIG. 4 is a rear isometric view of the example ferrule 120 along with a support portion 114 of the waveguide support 110, while FIG. 5 is a rear isometric view of the example ferrule 120 along with the waveguide support 110 operably attached thereto to define the example receptacle connector 109. FIG. 6 is a cross-sectional view of the receptacle connector 109 of FIG. 5.

The ferrule 120 may have any suitable configuration with an opening 127 disposed at the second surface 124 for receiving and securing a portion of at least one waveguide support 110 such as depicted in FIG. 4. The waveguide support 110 aligns the optical waveguides with the ferrule 120 and comprises a chip coupling surface 112 for cooperating with the optical chip 100. Further, the CTE characteristics of the at least one waveguide support 110 or ferrule 120 may be selected to match the materials of the optical chip 100 within a suitable range. By way of explanation, if the optical chip 100 comprises a silicon material having a CTE of 2.6 parts per million per degree Celsius, then the material of the waveguide support 110 or ferrule 120 may be matched within a predetermined range of the optical chip 100. By way of example, the waveguide support may have a CTE such as 2.6±0.5 parts per million per degree Celsius, but other ranges for the CTE are possible as well. Further, the materials may be selected such that the waveguide support material has a CTE with a closer match to the optical chip material CTE than the ferrule material CTE match. The waveguide support material may have a closer CTE match since it has a chip coupling surface that abuts the optical chip material. Further, it may be desirable to use different materials for the waveguide support and the ferrule such as a glass or ceramic material for the waveguide support and a polymer for the ferrule. However, any suitable materials may be selected for the waveguide support or the ferrule as desired.

Referring generally to FIGS. 1A, 1B and 2-6, the example ferrule 120 is configured as a multifiber ferrule such as a MT type ferrule. It should be understood that although example ferrule 120 is configured as a multi-fiber ferrule, the ferrule 120 may be configured to maintain any number (i.e., one or more) of optical waveguides 130. Each optical waveguide 130 can have a first end 132 and a second end 134. In an example, the optical waveguides 130 can comprise optical fibers, as described in more detail below. The optical waveguides 130 are referred to hereinafter as ferrule waveguides 130 to distinguish from other types of waveguides introduced and discussed below. The ferrule waveguides 130 are relative short in length and in an example constitute stub optical fibers. The ferrule waveguides 130 can also be referred to as "first waveguides" of the receptacle connector 109, while the transition waveguides (introduced and discussed below) can be referred to as "second waveguides."

The ferrule 120 is not limited to MT-type ferrules. Design parameters may include low insertion force to prevent damage or misalignment of the optical fiber-optical chip junction, receptacle materials capable of solder reflow temperatures, size and mechanical robustness scaled to the end application, and thermal stability.

In embodiments, the ferrule 120 is fabricated from a material having a CTE that is similar to the CTE of the optical chip such that positions of the ferrule waveguides 130 disposed within the ferrule 120 and the waveguide support 110 do not shift during the fabrication process (e.g., during the application of heat for a solder reflow process) or during operable of the optical assembly (e.g., heat caused by the operation of active optical components such as laser diodes and photodetectors). As non-limiting examples, the ferrule 120 may be fabricated from a glass material, a ceramic material, a glass-ceramic material, a metal material, or a glass-filled polymer material.

The ferrule 120 further includes at least one bore 126 extending from the first surface 122 into the ferrule body 121 and sized to accommodate the ferrule waveguides 130. As discussed below, in some embodiments, the ferrule waveguides do not reside entirely within the ferrule 120 but extend into the waveguide support 110.

The example ferrule 120 also includes a first alignment bore 125A and a second alignment bore 125B operable to receive first and second alignment pins, respectively, of a mated optical connector (not shown). As described in more detail below, the alignment bores and the alignment pins may provide alignment between the ferrule waveguides 130 of the receptacle connector 109 and the chip waveguides 106 of the optical chip 100. It should be understood that the receptacle connector 109 may include the first and second alignment pins, or each of the receptacle connector 109 and the mated optical connector may comprise one alignment bore and one alignment pin. In yet other embodiments, the receptacle connector 109 does not include an alignment pin(s) or an alignment bore(s).

The example ferrule 120 depicted in FIGS. 1A, 1B, and 2-6 comprises a plurality of bores 126 such as eight bores operable to receive eight ferrule waveguides 130. However, any suitable number of bores 126 and ferrule waveguides 130 may be provided. The one or more bores 126 and the first and second alignment bores 125A, 125B may be formed within the ferrule by any known or yet-to-be developed process. As a non-limiting example, the one or more bores 126 may be formed within a glass ferrule 120 by a laser-damage-and-etch process in which an ultrafast pulsed laser damages the glass material at the desired location of a through-hole. The damaged region(s) of the glass material etch at a significantly faster rate than the non-damaged region(s). Thus, with selective etching, precision through-holes may be created within the glass material.

Any laser-damage-and-etch process may be utilized to fabricate the bores 126 within the ferrule 120 comprising a glass material or any other suitable ferrule material. In one non-limiting process, a short-pulse laser in combination with line focus optics is used to drill a pilot hole or laser damage region, completely through the body of the glass with each laser pulse. The line focus optics creates a focal line that is equal to or greater than the thickness of the ferrule 120. An advantage of this process is that each laser pulse fully forms a pilot hole or laser damage region. Thus, the time to make a pilot hole or laser damage region is extremely short (e.g., approximately, 10 psec with a single pulse, for example, or approximately hundreds of nanoseconds even with a complete burst pulse). The ferrule 120 may then be exposed to an etching solution, such as a hydrofluoric acid-based etching solution, to preferentially etch the pilot hole or damage line within the glass faceplate, thereby forming a glass fiber through-hole having the desired diameter. More detail regarding example laser line focus and etching processes is provided in U.S. Pat. Publ. No. 2015/0166395, which is hereby incorporated by reference in its entirety. Of course, other methods for forming the bores 126 in the ferrule 120 are possible such as molding.

The bores 126 may have any suitable diameter depending on the type of waveguide inserted therein. Additionally, the bores 126 may have any defined pitch such as, without limitation, 125 μm, 127 μm and 250 μm. The ferrule 120 may take on any dimensions as desired per the end application. The receptacle connector 109 may advantageously have a low-profile design due to the relatively small size of the ferrule. In one non-limiting example, the ferrule 120 has a length of 8 millimeters (mm), a width of 6.4 mm, and a height of 2 mm.

In some embodiments, the first surface 122 may be non-orthogonal with respect to the optical axis of the ferrule 120 (i.e., non-orthogonal to the z-axis). In one non-limiting example, the first surface may be tilted 8° with respect to normal to the optical axis of the ferrule 120. Angling the first surface 122 reduces optical reflections at the mating surface.

Referring now to FIG. 3, the example ferrule 120 includes the aforementioned opening 127 at the second surface 124 for receiving a portion of the waveguide support 110. The opening 127 may be fabricated by any known or yet-to-be-developed process. As non-limiting examples, the opening 127 may be formed during a molding process, by mechanical machining, by an etching process, or by a laser damage and etching process. The shape of the opening 127 may take on any configuration, and may depend on the shape of the waveguide support 110. Referring briefly to FIG. 6, the opening 127 terminates at a back wall 129. The one or more bores 126 may extend between the first surface 122 and the back wall 129 of the opening 127 as shown.

The opening 127 is configured to receive a portion of the waveguide support 110. Waveguide support 110 may have any suitable configuration desired for securing and aligning the optical ferrule waveguides 130 as well as second (transition) waveguides 140 optically coupled (e.g., spliced) thereto, as shown in FIG. 4 and as discussed in greater detail below. As a non-limiting example, the waveguide support 110 comprises a support portion 114 and a cover portion 116, but the waveguide support may be a single component in other embodiments. Referring to FIG. 4, the support portion 114 is illustrated as inserted into the opening 127. The support portion 114 supports first-end sections 131 of the ferrule waveguides 130 and can also supports corresponding transition waveguides 140, which in an example are different than the ferrule waveguides 130 but may be the same as the ferrule waveguides 130 in other embodiments.

In embodiments, the ferrule waveguides 130 are a first type of optical fiber that have been stripped of (or manufactured without) all coatings and outer layers, such that the cladding layers of the optical fibers are exposed. Such an optical fiber is referred to as a bare fiber, and a portion of such a fiber is referred to as a bare fiber portion. By removing the coatings and outer layers, the optical fibers may be inhibited from deforming or shifting in position during the solder reflow process that is performed to connect electrical components of the optical assembly to respective circuit boards. During fabrication, the stripped optical fibers are inserted into respective bores 126 such that they extend through the opening 127 of ferrule 120. Likewise, in embodiments, the transition waveguides 140 are a second type of optical fiber that have been stripped of (or manufactured without) all coatings and outer layers, such that the cladding layers of the optical fibers are exposed, i.e., are bare optical fibers. The transition waveguides 140 are relative short in length and in an example constitute stub optical fibers.

Referring to FIGS. 5 and 6, a cover portion 116 is inserted into the opening 127 and secured to the support portion 114. The cover portion 116 may be secured to the support portion 114 by a suitable adhesive, but other materials are possible. The waveguide support 110 defined by the support portion 114 and the cover portion 116 has an end 117 at the second end 115 of the waveguide support 110 and that abuts the back wall 129 of the opening 127. In the illustrated embodiment, the cover portion 116 comprises one or more grooves 113, and is secured to the support portion 114 such that the end sections 131 of one or more ferrule waveguides 130 (e.g., stripped optical fibers) are disposed within the one or more grooves 113 along with corresponding transition waveguides (e.g., transition fibers) 140. As best seen in the close-up inset of FIG. 6, the second ends 134 of the ferrule waveguides 130 and the second ends 144 of the transition waveguides 140 are optically coupled to each other. In an example, this is accomplished by a waveguide splicing process that defines a splice SP. The splice SP can be formed using any one of a number of precision waveguide splicing techniques known in the art, such as fusion splicing or mechanical splicing. The first ends 142 of the transition waveguides 140 reside at or near the chip coupling surface 112 and (along with the grooves 113) define a receptacle pitch PR for the transition waveguides of the receptacle connector 109 (see FIG. 5). In an example, the receptacle pitch PR is substantially the same as the optical chip pitch PC, e.g., PR=PC. The splice SP defines an optical coupling location. Thus, in an example, the ferrule waveguides 130 and the transition waveguides 140 are concatenated, e.g., concatenated first and second optical fibers.

In an example, the splice SP resides within the waveguide support 110. The splice SP can also reside within the ferrule 120, e.g., within the respective bore 126. The splice SP can also reside within the adhesive 180 that is used to bond the waveguide support 110 to the ferrule 120. An example of this configuration is discussed below in connection with the close-up inset of FIG. 10A.

The one or more grooves 113 may be formed by any suitable process, such as precision machining, etching, or the like and may have any suitable shape such as v-grooves, u-grooves or the like. The ferrule waveguides 130 and the transition waveguides 140 spliced thereto may also be secured within the grooves 113 by a suitable adhesive, for example. In other embodiments, the support portion 114 comprises the one or more grooves 113 and the cover portion 116 is substantially planar. In other embodiments, both the support portion 114 and the cover portion 116 comprise grooves 113. Suitable adhesives for securing the waveguide support or optical waveguides may be tolerant to withstand the heat applied during the solder reflow process while still maintaining suitable performance.

The waveguide support 110 may be secured within the opening 127 using any suitable adhesive 180, such as a thermally-cured adhesive or a UV cured adhesive. However, this adhesive is not suitable for being in the optical path and it may be desirable to use other optical-transmissive adhesives if disposed in the optical path. Other examples of adhesives include a thermostable adhesive, such as a polymer, an organic-inorganic hybrid polymer, or by a thermostable adhesive free bonding material such as, without limitation a sol-gel.

Other variations of the receptacle connector 109 according to the concepts are possible and are described below. In alternative embodiments, the waveguide support 110 may be configured as a single piece rather than two pieces that is inserted into an opening of the ferrule. It still other embodiments, the grooves 113 need not be used. In such embodiments, a plurality of optical fibers 130 and transition fibers 140 are pressed between the support portion 114 and the cover portion 116, with the receptacle pitch PR of the receptacle connector determined by the diameter of the transition fibers 140. In other embodiments, the waveguide support 110 may not be configured as one or more components separate from the ferrule 120 but rather integral with the ferrule. For example, the waveguide support 110 may be an integral component extending from the second surface of the ferrule 120. In such embodiments, the waveguide support 110 may include bores rather than grooves for maintaining waveguides such as optical fibers.

As shown in FIGS. 5 and 6, the waveguide support 110 has the first surface 112 as the aforementioned chip coupling surface. The ferrule waveguides 130 have a first end 132 terminating at the first surface 122 of the ferrule and the chip coupling surface 112 of the waveguide support 110. A portion of each ferrule waveguide 130 is disposed within a bore 126 of the ferrule 120 and a portion is disposed within the waveguide support 110. The first surface 112 (as the chip coupling surface) may be polished and/or cleaved.

After the ferrule waveguides 130 are secured within the ferrule 120 and the ferrule waveguides and transition waveguides 140 are spliced and supported by the waveguide support 110, the receptacle connector 109 is coupled to the optical chip 100 such that the chip coupling surface 112 of the waveguide support 110 abuts the first edge 102 of the optical chip 100 (FIGS. 1A and 1B). The chip coupling surface 112 may be secured to the first edge 102 of the optical chip 100 by an adhesive that is transmissive to the wavelength(s) of light of the optical signals and that can withstanding the elevated temperatures of the solder reflow process (e.g., up to 260° C.) or elevated temperatures of a thermo-compression bonding (up to 300° C. for several seconds). The receptacle connector 109 is coupled to the optical chip 100 such that the one or more transition waveguides 140 are substantially aligned with the one or more chip waveguides 106. The one or more transition waveguides 140 may be aligned with the one or more chip waveguides 106 by an active alignment process, for example. In one example, a vision system (not shown) is utilized to substantially align the one or more transition waveguides 140 with the one or more chip waveguides 106. As used herein, the term "substantially aligned" means that the one or more transition waveguides 140 are aligned with the one or more chip waveguides 106 such that optical signals may pass therebetween without a predetermined amount of insertion loss such as, without limitation, 0.5 dB.

Figure 7:
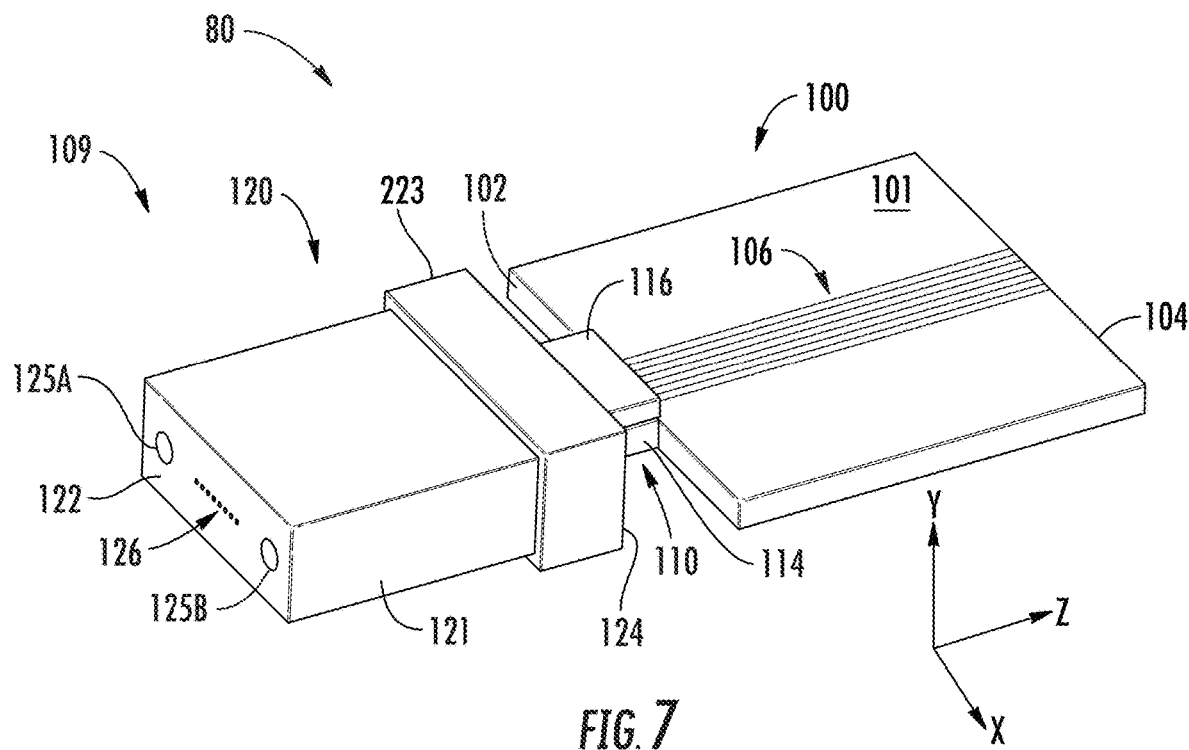
FIG. 7 schematically depicts an isometric view of another example optical assembly according to one or more embodiments described and illustrated herein.
Figure 8:
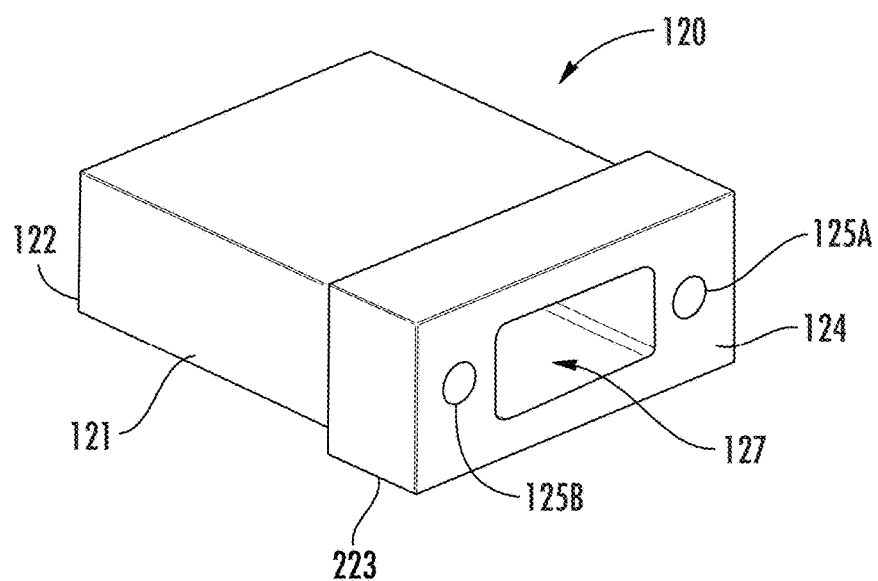
FIG. 8 schematically depicts a rear isometric view of an example ferrule of the example optical assembly depicted in FIG. 7 according to one or more embodiments described and illustrated herein.
Figure 9:
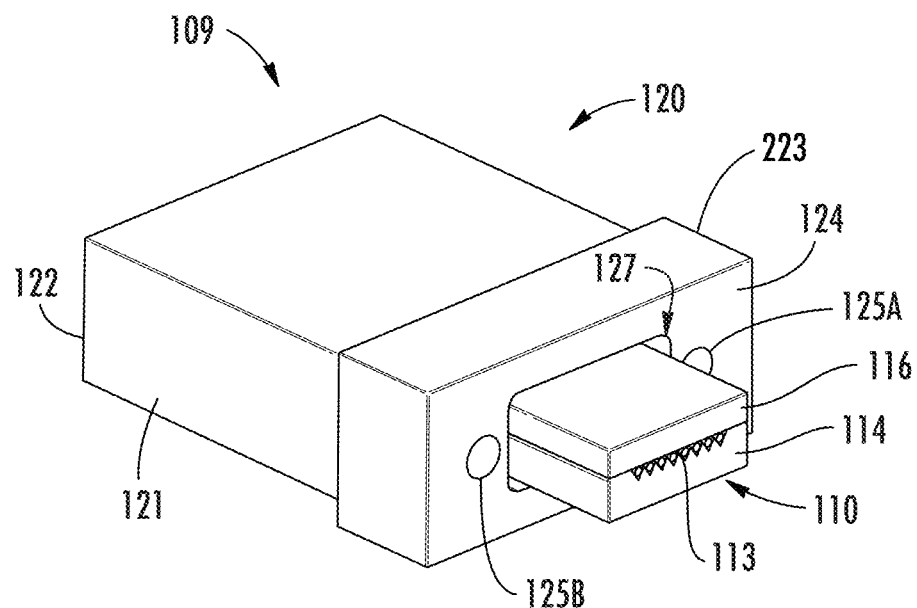
FIG. 9 schematically depicts a rear isometric view of an example receptacle connector of the example optical assembly depicted in FIG. 7 according to one or more embodiments described and illustrated herein.
Figure 10A:
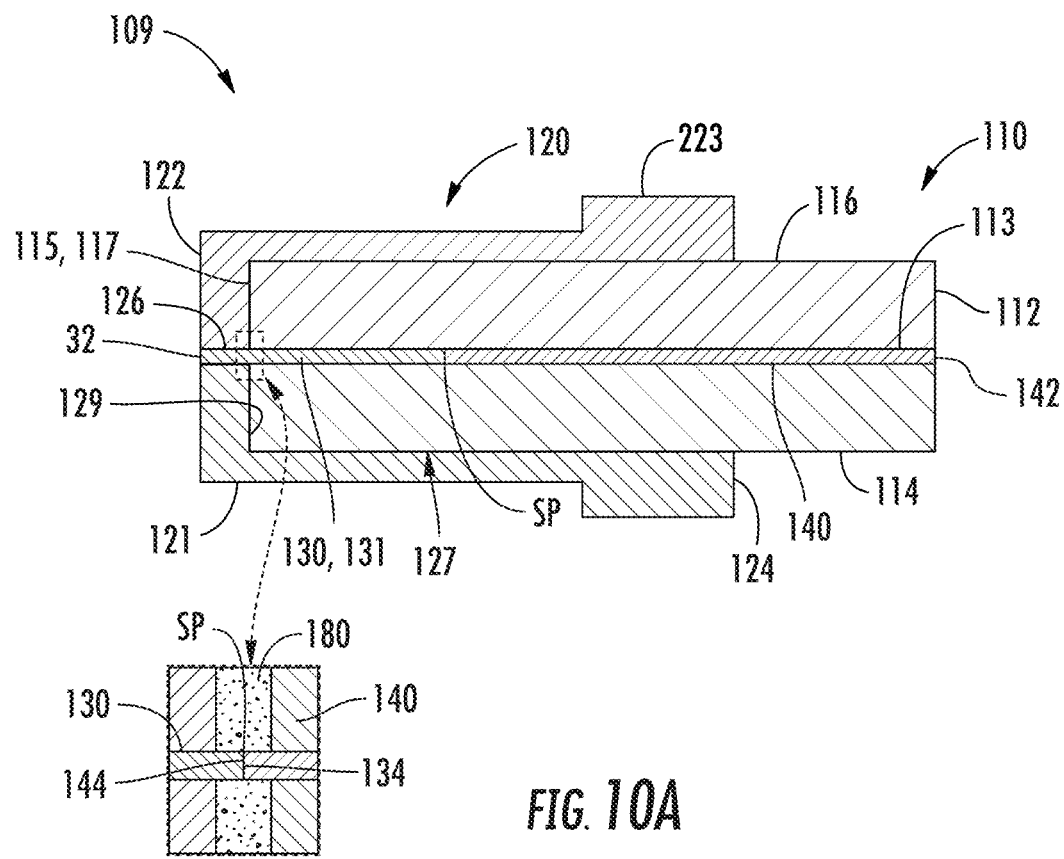
FIG. 10A schematically depicts a cross-sectional view of the example optical connector depicted in FIG. 9 according to one or more embodiments described and illustrated herein.

As stated above, the ferrule 120 may be made from any suitable material such as glass or a non-glass material. FIGS. 7-10A schematically illustrate another example receptacle connector 109 comprising a standard MT ferrule 120 with a waveguide support 110 inserted therein. FIG. 7 depicts an isometric view of an optical assembly 80 comprising the receptacle connector 109 coupled to an optical chip 100. The ferrule 120 may take on any suitable dimensions. In one non-limiting example, the ferrule 120 has a length of 8 mm, a width of 6.4 mm, and a length of 2 mm. The example receptacle connector 109 is coupled to the first edge 102 of the optical chip 100. FIG. 8 depicts a rear isometric view of the ferrule 120 depicted in FIG. 7. FIG. 9 depicts a rear isometric view of the receptacle connector 109 depicted in FIG. 7. FIG. 10A depicts a longitudinal cross-sectional view of the receptacle connector 109 depicted in FIG. 7.

The example ferrule 120 depicted in FIGS. 7-10A is similar to that of FIG. 3 and also includes a body 121 along with a flange portion 223 that defines the second surface 124. In the illustrated embodiment, the ferrule 120 is configured as an MT ferrule fabricated from a suitable thermoplastic material. By way of explanation, the thermoplastic material may be a thermoset or a thermoplastic material capable of withstanding the elevated temperatures of a solder reflow process (e.g., up to 260° C.) without unsuitable deformation that causes excess misalignment. In some examples, the ferrule 120 is made from a thermoset or thermoplastic material that is filled with glass fibers or glass particles. The filler materials can improve or change performance characteristics such as thermal properties or CTE. The ferrule 120 may be fabricated by a molding process as known. Of course, ferrule 120 may comprise other polymer materials or any other suitable materials, such as glass, ceramic, glass-ceramic, or metal.

Referring to FIG. 7, the ferrule 120 also comprises the first alignment bore 125A and a second alignment bore 125B, which are configured to receive a first and second alignment pins 265A and 265B of a mated plug connector 250 (see FIG. 18) for making an optical connection. Different schemes are possible for the corresponding pins and bores. For instance, receptacle connector 109 may include the first and second alignment pins, or each of the receptacle connector 109 and the mated plug connector may comprise one alignment bore and one alignment pin. In yet other embodiments, the receptacle connector 109 does not include an alignment pin(s) or an alignment bore(s).

The ferrule 120 further includes at least one bore 126 extending from the first surface 122 into the body 121. The example ferrule 120 depicted in FIGS. 7-10A comprises eight bores 126 operable to receive eight ferrule waveguides 130. However, ferrules may have any number of bores 126 for receiving any number of ferrule waveguides 130 may be provided. As an example and not a limitation, the one or more bores 126, as well as the first and second alignment bores 125A, 125B may be fabricated by a precision molding process. Further, the bores 126 may open to a common pocket or slot disposed on the first surface 122 of the body 121 of ferrule 120. Using a common pocket or slot allows for a strong bond between the ferrule waveguides 130 and the ferrule body 121.

In some embodiments, the first surface 122 may be non-orthogonal with respect to the optical axis of the ferrule 120 (i.e., non-orthogonal to the z-axis). In one non-limiting example, the first surface may be tilted 8° with respect to normal to the optical axis of the ferrule 120. Other tilt angles may be utilized for the first surface.

Referring to FIG. 8, the example ferrule 120 includes the opening 127 at the second surface 124 for receiving the waveguide support 110. The opening 127 extends through the flange portion 223 and into the body 121. The opening 127 may be fabricated during a molding process, for example. Referring now to FIGS. 9 and 10A, the waveguide support 110 is inserted into the opening 127. In this embodiment, the end 117 of the waveguide support 110 abuts the back wall 129 of the opening 127 of the ferrule 120.

The waveguide support 110 can be fabricated from a material that has a CTE that substantially matches the CTE of the material of the optical chip 100 within a suitable range for the desired performance such as within ±0.5 parts per million per degree Celsius, but other ranges are possible as well. In one non-limiting example, the waveguide support 110 is fabricated from glass. In other embodiments, the waveguide support 110 is made of glass-ceramic, fused silica or silicon.

The waveguide support 110 may also be secured within the opening 127 by the adhesive 180. The adhesives utilized in the receptacle connector 109 should be thermostable, such as such as a polymer, an organic-inorganic hybrid polymer, or by a thermostable adhesive free bonding material such as, without limitation, a sol-gel. The adhesive can be selected that maintains suitable alignment and securing after being processed through a solder reflow process.

Referring to FIG. 10A, the one or more ferrule waveguides 130 are disposed within the one or more bores 126 of the ferrule 120 and with the end sections 131 within the one or more grooves 113 of the waveguide support 110 and spliced to respective transition waveguides 140 to define splices SP. As described above, the one or more ferrule waveguides 130 and respective one or more transition waveguides 140 may each be configured as one or more optical fibers having any coatings and outer layers stripped therefrom. The first surface 122 of the ferrule 120 and the chip coupling surface 112 may be polished and/or laser cleaved.

It is also noted that the adhesive 180 can be inserted between the second end 115 of the waveguide support 110 and either the second surface 124 of the ferrule 120 (see FIG. 1B) or the wall 129 (see FIG. 10A) to secure the waveguide support to the ferrule. With respect to the close-up inset of FIG. 10A, in an example, the splice SP can reside within the adhesive 180.

The construction advantageously allows the polished receptacle connector 109 allows testing and performance evaluation before being attached to an optical chip if desired. The shape, dimension, number of parts, and/or the material of the ferrule, the waveguide(s), the waveguide support, and other parts of the receptacle connector may be changed and customized dependent on the optical assembly requirements and specifications.

Referring again to FIG. 7, after the ferrule waveguides 130 are secured within the ferrule 120 and the end sections 131 are spliced to respective transition waveguides 140 and the spliced waveguides are supported in the waveguide support 110, the receptacle connector 109 is coupled to the optical chip 100 such that the chip coupling surface 112 of the waveguide support 110 is adjacent or abuts the edge 102 of the optical chip 100. The chip coupling surface 112 may be secured to the edge 102 of the optical chip 100 by an adhesive that is transmissive to the wavelength(s) of light of the optical signals and is also capable of withstanding the elevated temperatures of the solder reflow process (e.g., up to 260° C.). The receptacle connector 109 is coupled to the optical chip 100 such that the one or more transition waveguides 140 are substantially aligned with the one or more chip waveguides 106. The one or more transition waveguides 140 may be aligned with the one or more chip waveguides 106 by an active alignment process, for example. In one example, a vision system (not shown) can be utilized to substantially align the one or more transition waveguides 140 with the one or more chip waveguides 106. In the example where there are multiple chip waveguides 106 and multiple transition waveguides 140, the receptacle pitch PR is substantially the same as the optical chip pitch PC, e.g., PR=PC, as noted above.

Figure 10B:
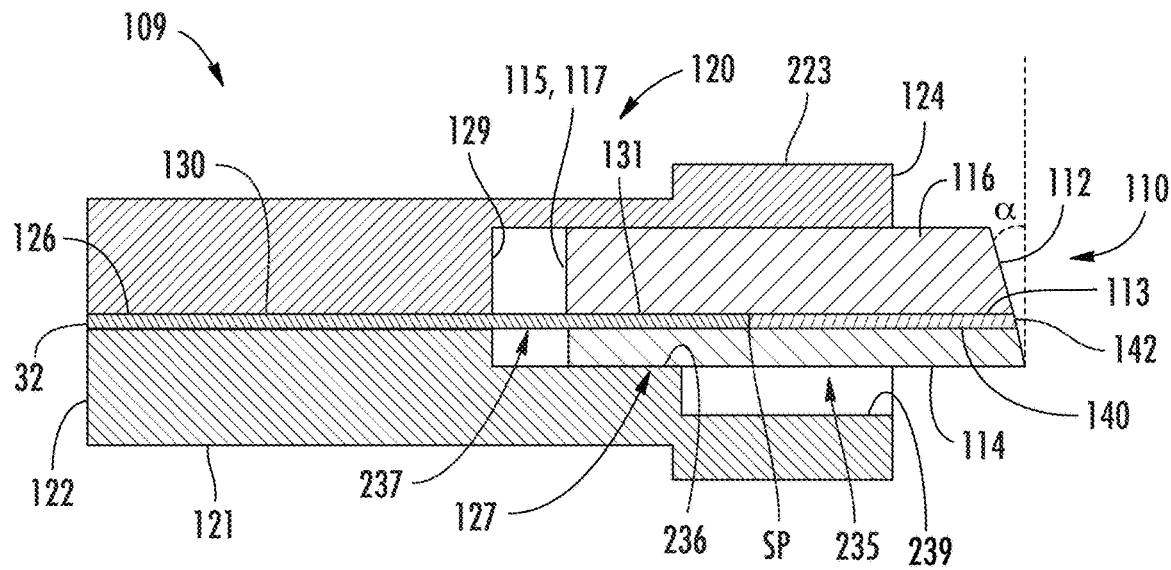
FIG. 10B schematically depicts a cross-sectional view of an example receptacle connector having a gap between a second surface of the waveguide support and an interior surface of the ferrule according to one or more embodiments described and illustrated herein.
Figure 10C:
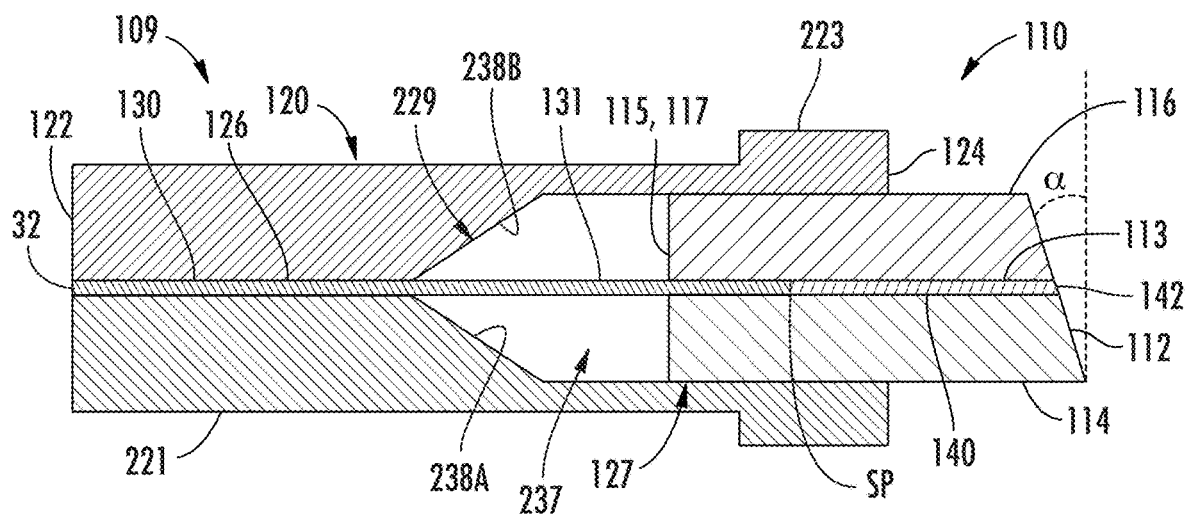
FIG. 10C schematically depicts a cross-sectional view of an example receptacle connector wherein the ferrule has a tapered interior surface for receiving one or more ferrule waveguides according to one or more embodiments described and illustrated herein.

Variations of the receptacle connectors 109 and optical assemblies 80 discussed above are contemplated. FIGS. 10B and 10C schematically depict cross-sectional views of alternative receptacle connectors 109. In FIG. 10B, the waveguide support 110 is disposed within the opening 127 of the ferrule 120 such that a gap 237 is present between the end 117 of the waveguide support 110 and the interior back wall 129 of the ferrule 120. In some embodiments, one or more mechanical stop features (not shown) may be fabricated in the walls of the opening 127 to provide a back-stop for the end 117 of the waveguide support 110. The support portion 114 may rest on a support surface 236 within the opening 127. In the illustrated embodiment, the opening 127 is larger proximate the second surface 124 of the ferrule such that a recessed region 235 is defined between support portion 114 and a surface 239 of the opening 127. The waveguide support 110 may be secured within the opening 127 by any means such as, without limitation, an interference fit and/or use of the adhesive 180.

The end sections 131 of the one or more ferrule waveguides 130 and the transition waveguides 140 spliced thereto are disposed within the one or more grooves 113 of the waveguide support 110, while the ferrule waveguides 130 are disposed in the one or more bores 126 of the ferrule 120 such that the one or more ferrule waveguides 130 traverse the gap 237.

Referring to FIG. 10C, the back wall 129 of the ferrule 120 has a tapered surface, such as a first tapered surface 238A and a second tapered surface 238B The one or more bores 126 extend between the first surface 122 to the tapered back wall 129. Also, the chip coupling surface 112 of the waveguide support 110 is shown as tilted by a tilt angle α (measured relative to the vertical or y-direction) to avoid back reflections. However, it should be understood that embodiments may have a non-titled (i.e., vertical) chip coupling surface 112.

The waveguide support 110 is disposed within the opening 127 of the ferrule 120 such that a gap 237 is present between the end 117 of the waveguide support 110 and the tapered back wall 129. In some embodiments, one or more mechanical stop features (not shown) may be fabricated in the walls of the opening 127 to provide a back-stop for the end 117 of the waveguide support 110. The waveguide support 110 may be secured within the opening 127 by any means such as, without limitation, an interference fit and/or use of the adhesive 180. One or more end sections 131 of the ferrule waveguides 130 and the transition fibers 140 spliced thereto are disposed within the one or more grooves 113 of the waveguide support 110 and the one or more bores 126 of the ferrule 120 such that the one or more ferrule waveguides 130 traverse the gap 237. The first tapered surface 238A and the second tapered surface 238B may assist in guiding the one or more ferrule waveguides 130 into the one or more bores 126 of the ferrule 120'.

In example embodiments, the ferrule waveguides 130 have a first mode-field diameter (MFD) and the transition waveguides 140 have a second MFD. In one example, the first MFD is greater than the second MFD. This configuration is useful when the chip waveguides 106 of the optical device have a MFD that is smaller than the first MFD of the ferrule waveguides 130. In an example, the second MFD is between 25% and 75% of the first MFD or between 25% and 50% of the first MFD. In a more specific example, the first MFD is about 9 μm while the second MFD is about 3 μm. In an example, the transition waveguide 140 can include an adiabatic taper so that the transition waveguide starts out wide at the second end 144 (i.e., at the splice SP) and has substantially the first MFD and then gets narrower toward the first end 142 where it has the second MFD.

In another example, the first MFD is smaller than the second MFD. This configuration is useful in reducing losses due to misalignment between the transition waveguides 140 and the chip waveguides 106. In an example, the second MFD is between 5% and 50% larger than the first MFD or between 5% and 25% larger than the first MFD. In an example, the transition waveguide 140 can include an adiabatic taper so that starts out narrow at the second end 144 (i.e., at the splice SP) and with substantially the first MFD and gets wider toward the first end 142 where it has the second MFD.

Figure 11A:
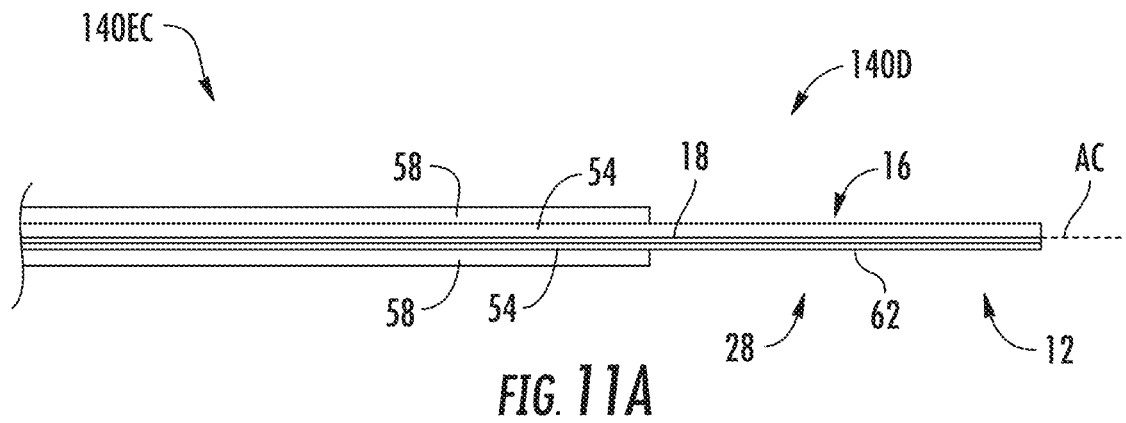
FIG. 11A is a side view and FIG. 11B is a cross-sectional view of an example exposed-core optical fiber in the form of a "D-shaped" optical fiber that can be employed as the transition waveguide of an embodiment of the receptacle connector as disclosed herein.
Figure 11B:
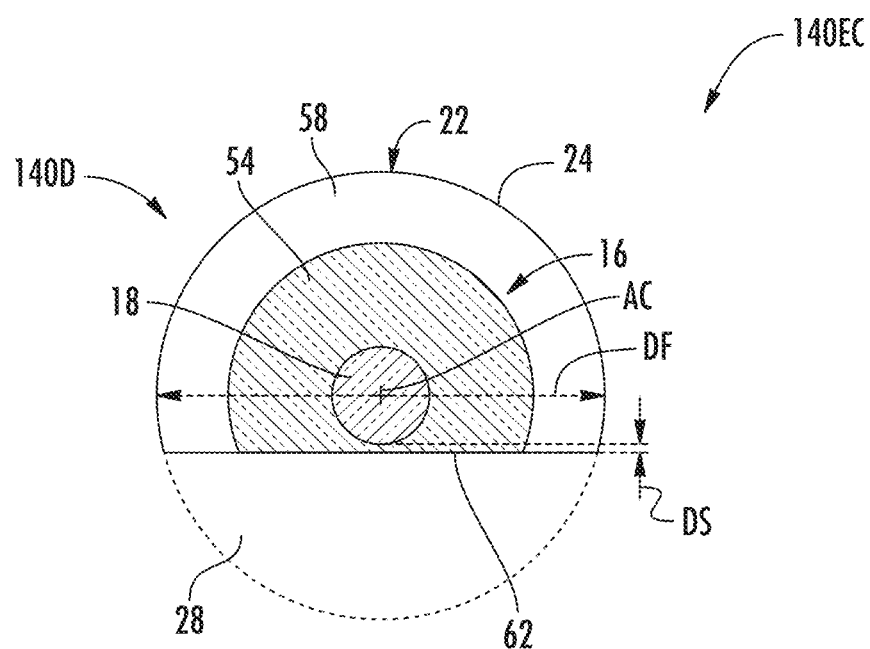

An aspect of the disclosure utilizes an exposed-core optical fiber as the transition waveguide 140. An exposed-core optical fiber is an optical fiber wherein the core resides relatively close to or at an outer surface of the optical fiber. This configuration facilitates light coupling into the core and along the length of the exposed-core optical fiber. FIG. 11A is a side view and FIG. 11B is a cross-sectional view of an exemplary type of exposed core optical fiber ("exposed-core fiber") 140EC referred to as a "D-shaped" optical fiber ("D-shaped fiber') 140D due to its cross-sectional shape. The discussion below now refers to the D-shaped optical fiber 140D in detail, but the types of exposed core optical fibers 140EC that can be employed are not limited to just the example D-shaped fiber 140D.

The D-shaped fiber 140D includes a central axis AC and has an overall diameter DF. The D-shaped fiber 10 includes a glass portion 16 defined by a glass core 18 of refractive index $n_{co}$ and a glass inner cladding 54 of refractive index $n_{cl}$, where $n_{co} > n_{cl}$. A typical single mode D-shaped fiber 140D can have a core refractive index $n_{co}$ of 1.4491 and a cladding refractive index $n_{cl}$ of 1.444 at a wavelength of 1550 nm.

The D-shaped fiber 10 includes an outer cladding 58 positioned around the glass portion 16 and in particular around the glass inner cladding 54. The outer cladding 58 is made of a polymer and so is referred to hereinafter as the polymeric outer cladding 58 to distinguish from the glass inner cladding 54. The combination of the glass core 18, the glass inner cladding 54 and the polymeric outer cladding 58 is what makes the fiber 10 a polymer-clad optical fiber. FIG. 11A shows a stripped end section 28 that exposes the glass portion 16.

The polymeric outer cladding 58 can be composed of two parts: an inner, softer layer and an outer harder layer. The polymeric material that makes up the polymeric outer cladding 58 may include high density acrylate, low density acrylate, polyethylene, polystyrene, polymethylmethacrylate, nylon, silicone, silicone based materials, fluorinated acrylates, polyimide, ethylene tetrafluoroethylene, fluoroacrylate, fluoromethacrylate and combinations thereof. The polymeric material may be optically transparent. The polymeric outer cladding 58 may have a diameter ranging from between about 10 μm and about 900 μm, between about 80 μm and about 250 μm or between about 100 μm and 150 μm.

The glass inner cladding 54 and the polymeric outer cladding 58 cooperate to form a cladding 22 disposed around the core 18. The fiber 10 has an outer surface 24, which can be defined either by: i) the polymeric outer cladding 58; ii) a portion of the polymeric outer cladding 58 and a portion of the glass inner cladding 54; or iii) a portion of the polymeric outer cladding 58 and a portion of the glass inner cladding 54 and a portion of the core 18.

The core 18 may be composed of pure silica, doped silica (e.g., doped with germanium, aluminum, titanium, and/or chlorine) and/or other optically transparent materials. The glass inner cladding 54 may be composed of pure silica, doped silica (e.g., fluorine, boron, and/or titanium) or other optically transparent materials. The selective doping of the core 18 and the glass inner cladding 54 used to form an evanescent coupler with suitably high coupling efficiency CE is described in greater detail below.

The glass portion 16 has a glass-portion surface 62 that can be exposed when the end section 12 of the fiber 10 is processed to remove some of the polymeric outer cladding 58 to form a stripped end section 28. In an example, this removal process is carried out prior to drawing the fiber 10. Note that in some examples, the glass-portion surface 62 is formed by only the glass inner cladding 54 as shown, while in other examples the glass-portion surface is formed by both the glass inner cladding and the core 18. The glass-portion surface 62 may be flat and run parallel to the central axis AC of the D-shaped fiber 140D and/or may extend coaxially with the fiber for either a portion of the fiber 10 or the entire length of the fiber. In examples, the glass inner cladding 54 along with the flat glass-portion surface 62 gives the D-shaped fiber 140-D its "D" shape, especially at the stripped end section 28. In the example of FIG. 1B, the core 18 resides a distance DS from the flat glass-portion surface. In general, the distance DS is in the range 0 μm≤DS≤4 μm. In examples, the flat glass-portion surface 62 can cut into an otherwise round core 18 so that the core can have a D shape and be part of the flat glass-portion surface 62. In an example, the glass core 18 is centered on the central axis. The glass-portion surface 62 can be used effectively for optical coupling applications because it provides access to the guided light traveling within the D-shaped fiber 140D.

Figure 12A:
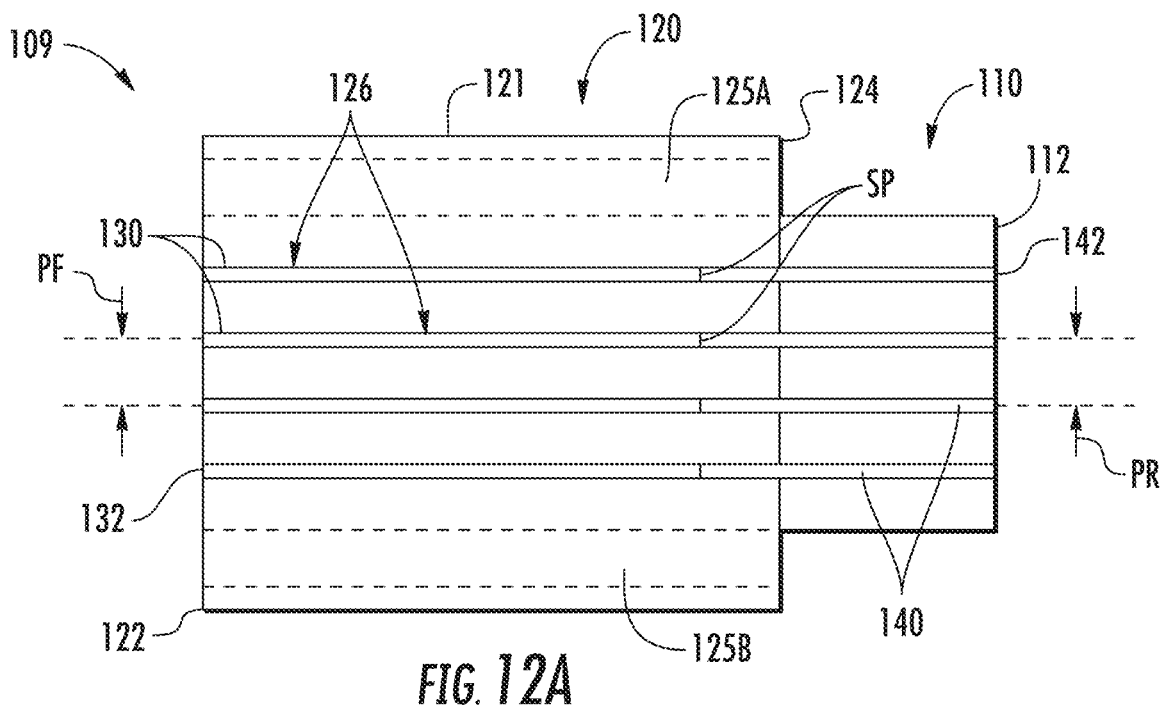
FIG. 12A is a top-down view of an embodiment of the receptacle connector wherein the ferrule pitch is the same as the receptacle pitch.

FIG. 12A is a top-down view of an example receptacle connector 109 illustrating an embodiment where the ferrule waveguides 130 define a pitch PF ("ferrule pitch") at the first surface 122 of the ferrule 120 while and the transition waveguides 140 have a receptacle pitch PR at the chip coupling surface 112, wherein PF=PR. In the example of FIG. 12A, the splices SP are shown as residing within the bores 126 of the ferrule 120 by way of example.

Figure 12B:
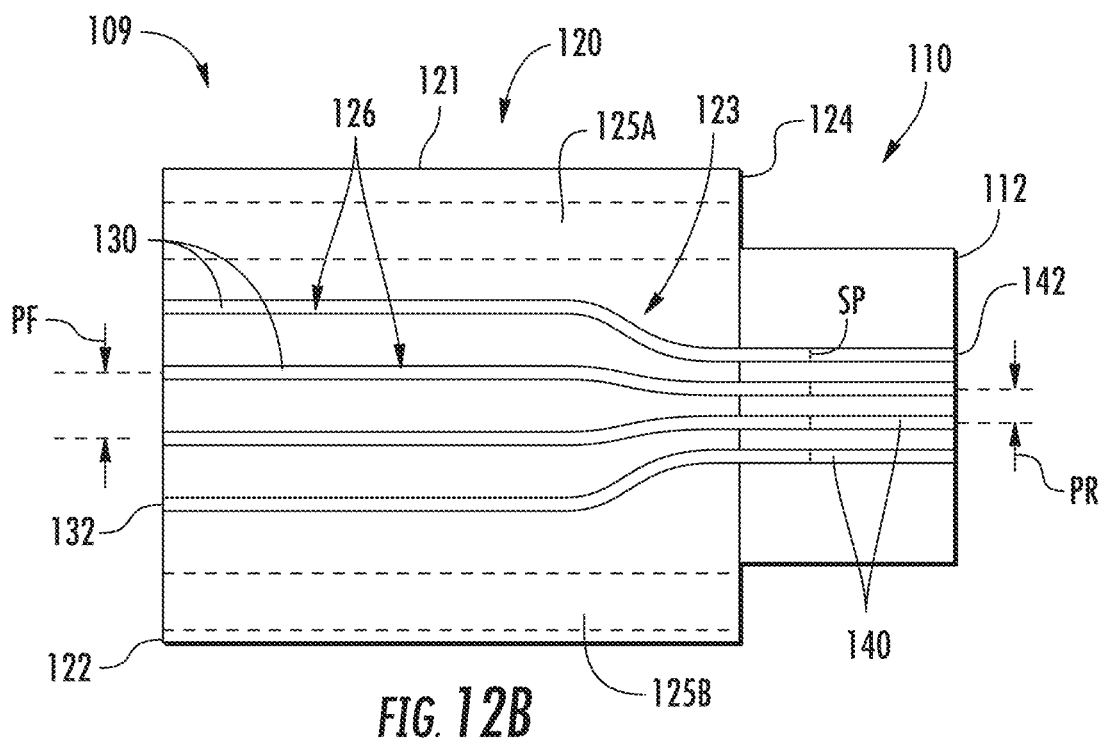
FIG. 12B is a top-down view of an embodiment of the receptacle connector wherein the ferrule includes a fan-in region that results in the receptacle pitch being smaller than the ferrule pitch.

FIG. 12B is similar to FIG. 12A and illustrates an embodiment wherein PR<PF. This configuration is accomplished by the ferrule 120 configured with a fan-in region 123. In an example, the fan-in region 123 is defined by the bores 126 converging from the first surface to the second surface. In an example, the fan-in region 123 is configured to minimize bending of the outermost ferrule waveguides 130. In an example, the ferrule pitch PF is a standard connector pitch such as 250 μm, while the receptacle pitch PR can be the same (as in FIG. 12A) or substantially smaller, e.g., 127 μm or smaller (as in FIG. 12B). In an example, the ferrule waveguides 130 reside in a common plane and the bends in the ferrule waveguides are in-plane bends.

With reference to the end-on views of FIG. 12C, in an example, the ferrule 120 comprises two rows of twelve ferrule waveguides 130 at the first surface 122 at a conventional ferrule pitch PF (e.g., nominally 250 μm) while the chip coupling surface 112 of the waveguide support 110 comprises a single row of twenty-four transition waveguides with a relatively high-density receptacle pitch PR<PF, e.g., 127 μm or 125 μm. This change between the ferrule pitch PF and the receptacle pitch PR allows for the receptacle pitch PR to be substantially the same as the optical chip pitch PC, thereby enabling optical coupling to the chip waveguides 106.

Figure 13A:
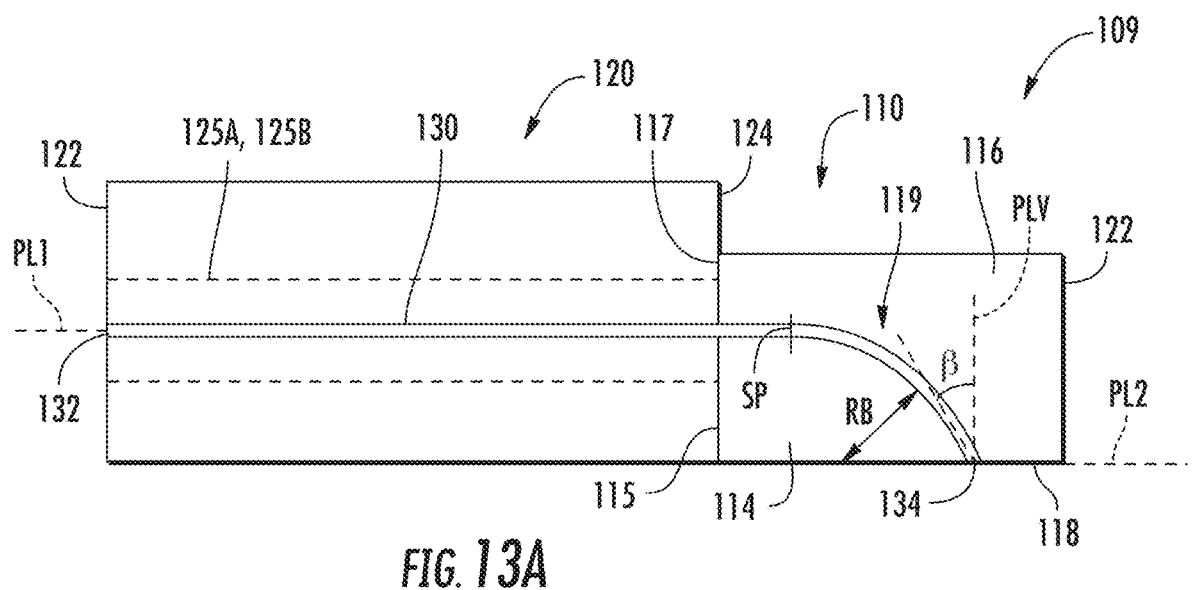
FIG. 13A is a close-up cross-sectional view of an embodiment of a receptacle connector wherein the waveguide support includes a curved support surface.

FIG. 13A is a cross-sectional view of an example receptacle connector 109 wherein the support portion 114 of the waveguide support 110 defines the bottom surface 118 and has support surface 114S with a curved section. The cover portion 116 has a cover surface 116S with a curved section that complements the curved section of the support surface. The curved surfaces 114S and 116S define an example of an out-of-plane bending feature 119. The ferrule waveguides 130 reside in a first plane PL1. The curved support portion 114 and cover portion 116 of the waveguide support 110 bend the transition fibers 140 to be out of the first plane P1 at a bend angle β relative to a vertical plane PLV (and as measured at the very end of the transition fiber immediately adjacent the end face 142), so that the end face 142 of the transition fiber resides in a second plane PL2 that is parallel to the first plane PL1, with the planes PL1 and PL2 being substantially perpendicular to the vertical plane PLV. Such a bend is referred to herein as an out-of-plane bend. In an example, the bend angle β is between 0° and 10°, such as 8° to minimize reflections. In another example, the bend angle is for optimizing optical coupling of guided light to a grating on the optical chip 100, as discussed below.

In an example, the out-of-plane bending feature 119 imparts to the transition waveguides 140 a bend radius RB that is greater than a minimum bend radius for the transition waveguides. This configuration makes the bottom surface 118 also the chip coupling surface since it is where the first ends 142 of the transition fibers 140 are exposed.

Figure 13B:
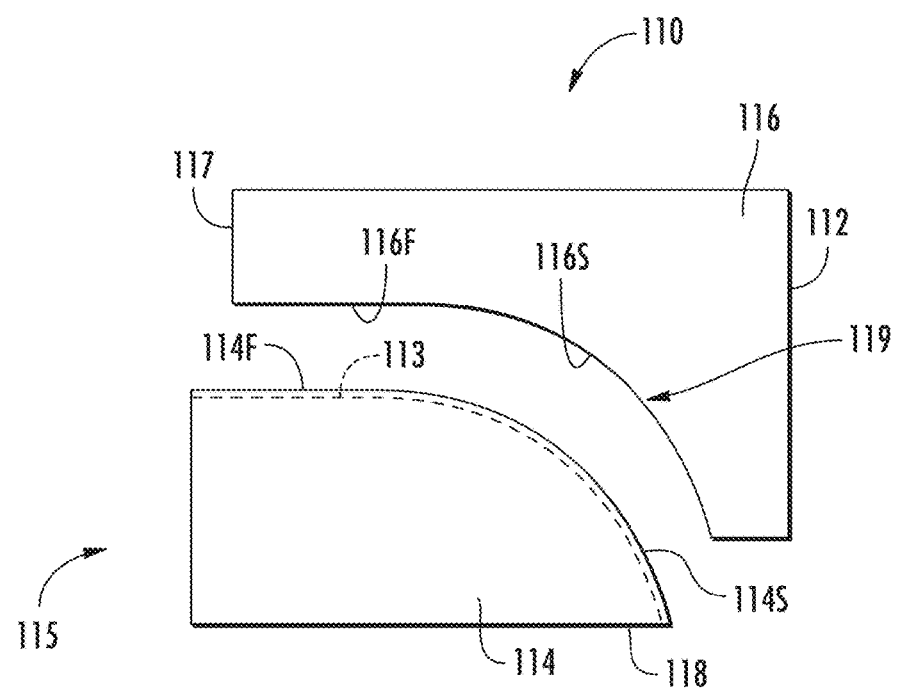
FIG. 13B is a close-up exploded view of an example two-part waveguide support showing the curved surfaces of the support portion and the cover portion.

FIG. 13B is a close-up exploded side view of the example curved support portion 114 and the example curved cover portion 116 of the waveguide support 110. In an example, the support surface 114S includes a flat section 114F and the cover surface 116S of the cover portion 116 has a corresponding flat section 116F where the splice SP between the one or more ferrule waveguides 130 and the one or more transition waveguides 140 can reside. In an example, either or both of the support surface 114S and the cover surface 116S can include grooves 113.

Figure 13C:
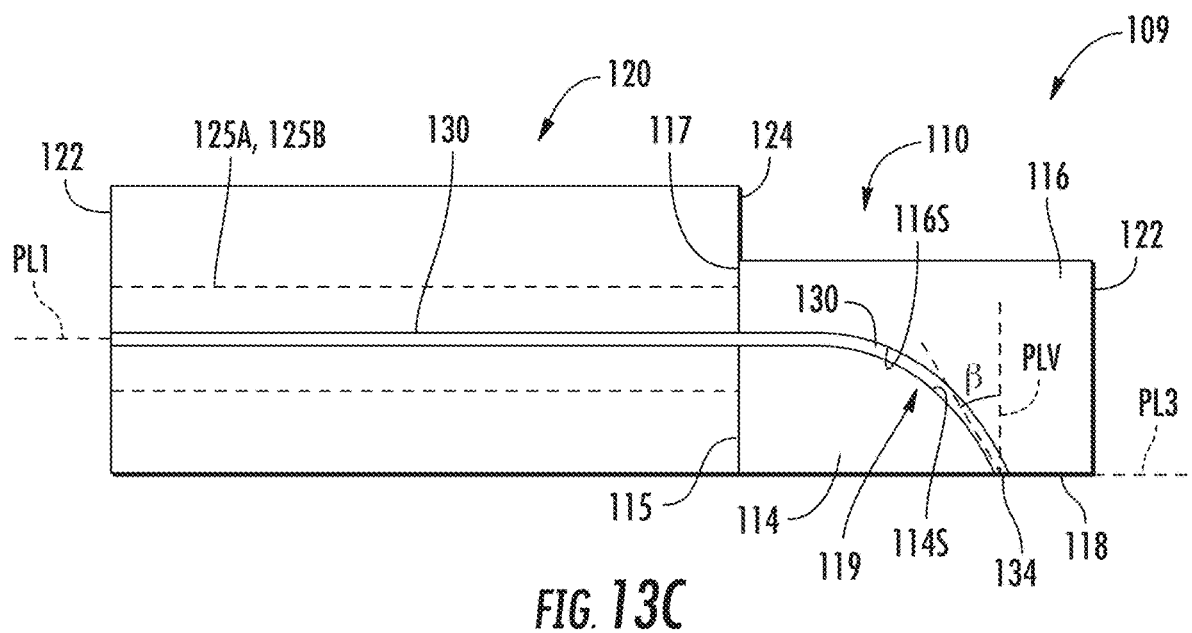
FIG. 13C is similar to FIG. 13A and shows an example where the ferrule waveguide passes through the waveguide support and to the bottom surface thereof, which serves as the chip coupling surface.

FIG. 13C is similar to FIG. 13A and illustrates an embodiment of the receptacle connector 109 wherein the one or more ferrule waveguides 130 extend all the way to the bottom surface 188 of the support portion 114 of the waveguide support, thereby obviating the need for splicing to a transition waveguide 140. This configuration can be thought of as the ferrule waveguides 130 defining the transition waveguides 140 in a special case where the transition waveguides are the same as the ferrule waveguides. As in the embodiment of FIG. 13A, the second end face 134 of the ferrule waveguides 130 can have a select angle relative to the bottom surface 118 of the support portion 114.

Figure 13D:
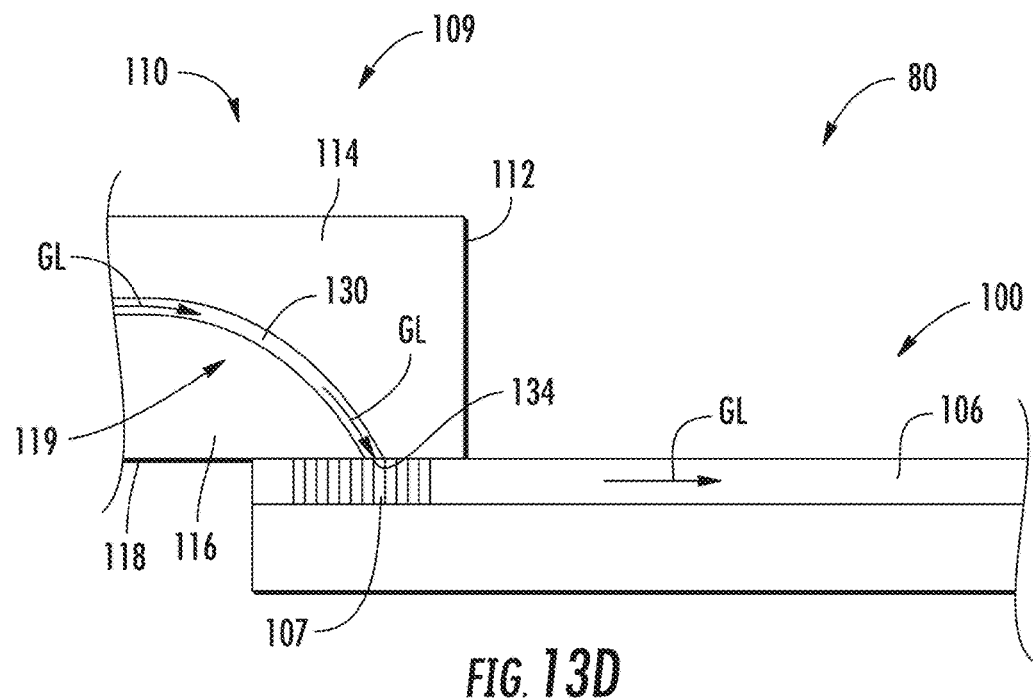
FIG. 13D is a close-up cross-sectional view of an embodiment of an optical assembly that shows how guided light can be optically coupled into the chip waveguides of an optical chip using the receptacle connector of FIG. 13C.

FIG. 13D is a close-up side view of an example optical assembly 80 that includes the waveguide support 110 of the receptacle connector of FIG. 13C operably disposed relative to the optical chip 100. The chip waveguide 106 is in optical communication with a coupling grating 107 that has a coupling angle. Guided light GL is shown traveling in the ferrule waveguide 130 toward the optical chip 100. The guided light GL travels around the bend in the ferrule waveguide and exits the ferrule waveguide at the second end face 134. The guided light GL is then optically coupled into the chip waveguide 106 by the coupling grating 107. As noted above, the ferrule waveguide 130 can be supported by the waveguide support 110 such that the guided light GL exiting the ferrule waveguide at the second end face 134 is incident the coupling grating 107 substantially at the optimum coupling angle of the coupling grating. Likewise, the coupling grating 107 can be configured to have a coupling angle that makes for a convenient configuration of the waveguide support 110, e.g., a relatively shallow bend in either the ferrule waveguide 130 (for the embodiment of FIG. 13C) or the transition waveguide 140 (for the embodiment of FIG. 13A).

Figure 14A:
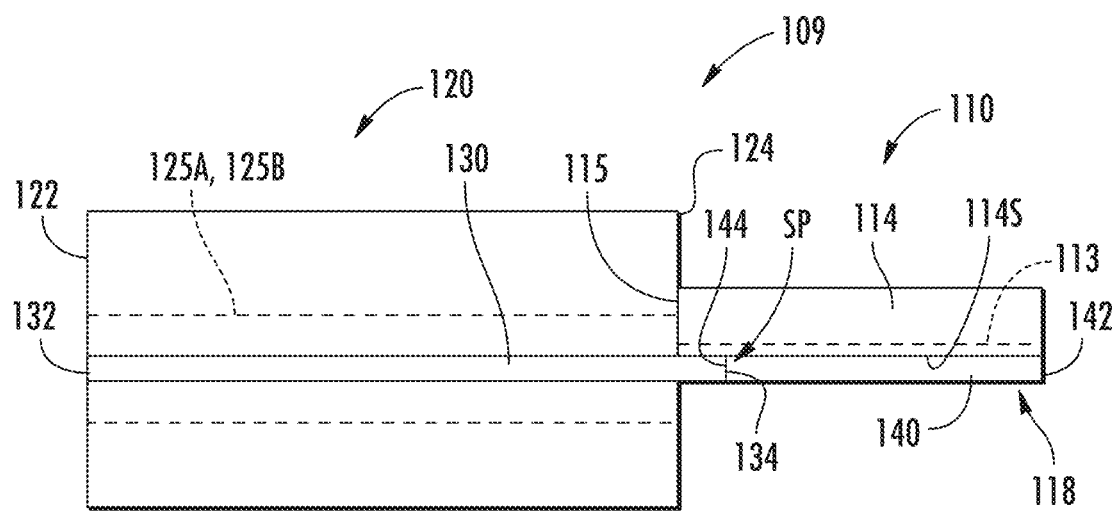
FIG. 14A is a close-up cross-sectional view of an embodiment of a receptacle connector configured for establishing evanescent optical coupling to the chip waveguides of an optical chip.

FIG. 14A is a close-up cross-sectional view of an example receptacle connector 109 configured for evanescent optical coupling to the chip waveguides 106 of the optical chip 100. The waveguide support 110 is shown as constituted by just the support portion 114 with a (non-curved) support surface 114S that supports the one or more transition waveguide 140. In an example, the support surface 114S can include grooves 113. Also in an example, the one or more transition waveguides 140 can be secured to the support surface 114S using an adhesive. In this embodiment, the support surface 114S defines the bottom surface 118 of the waveguide support 110, wherein the bottom surface is the chip coupling surface. The chip coupling surface 118 supports select lengths of the transition waveguides 140 so that evanescent coupling can occur along at least a portion of the select lengths.

In an example, each transition waveguide 140 can comprise an exposed-core fiber 140EC such as the D-shaped optical fiber 140D as described above, with the glass-portion surface 62 facing downward in FIG. 14, i.e., away from the support surface 114S. In another example, the one or more transition waveguides 140 can comprise a waveguide chip, e.g., planar lightwave circuit (PLC) that supports an array of the transition waveguides as planar waveguides (e.g., channel waveguides). In an example, the transition waveguides 140 can comprise ion-exchanged waveguides in glass or polymer waveguides.

Figure 14B:
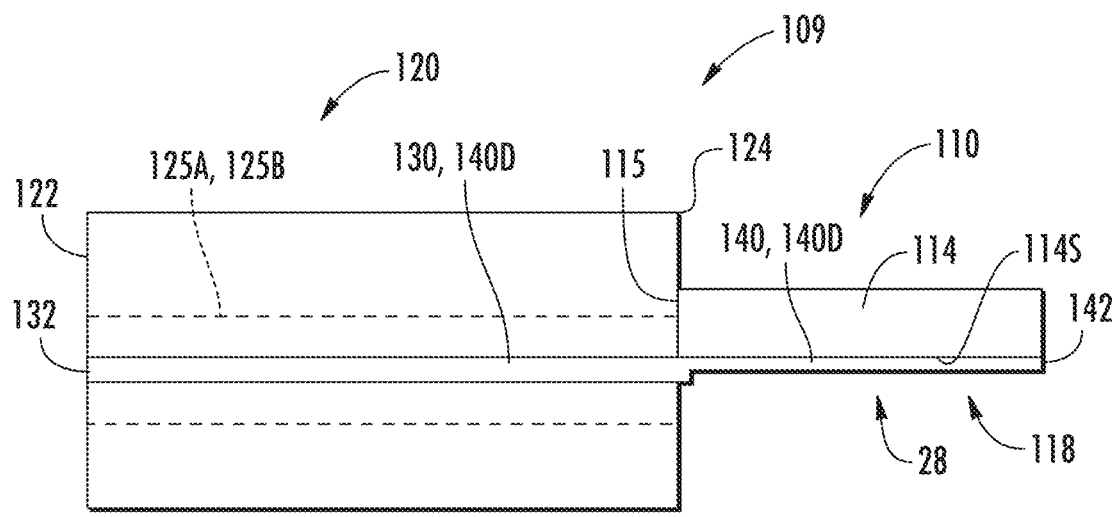
FIG. 14B is similar to FIG. 14A and illustrates an embodiment wherein the ferrule waveguide and the transition waveguide are respectively defined by a D-shaped optical fiber and a stripped end of the D-shaped optical fiber.

In another example illustrated in FIG. 14B, the one or more transition waveguides 140 are defined by extending the ferrule waveguides 130 all the way through the waveguide support 110, but with the transition waveguides 140 defined by a stripped first-end section 131 of the ferrule waveguides within the waveguide support. In an example, the stripping can be accomplished using a laser-based stripping process as is known in the art. In this particular example, the ferrule waveguides 130 can comprise the D-shaped fibers 140D, with the transition waveguides 140 defined by the stripped section 28 of the D-shaped waveguides.

Figure 14C:
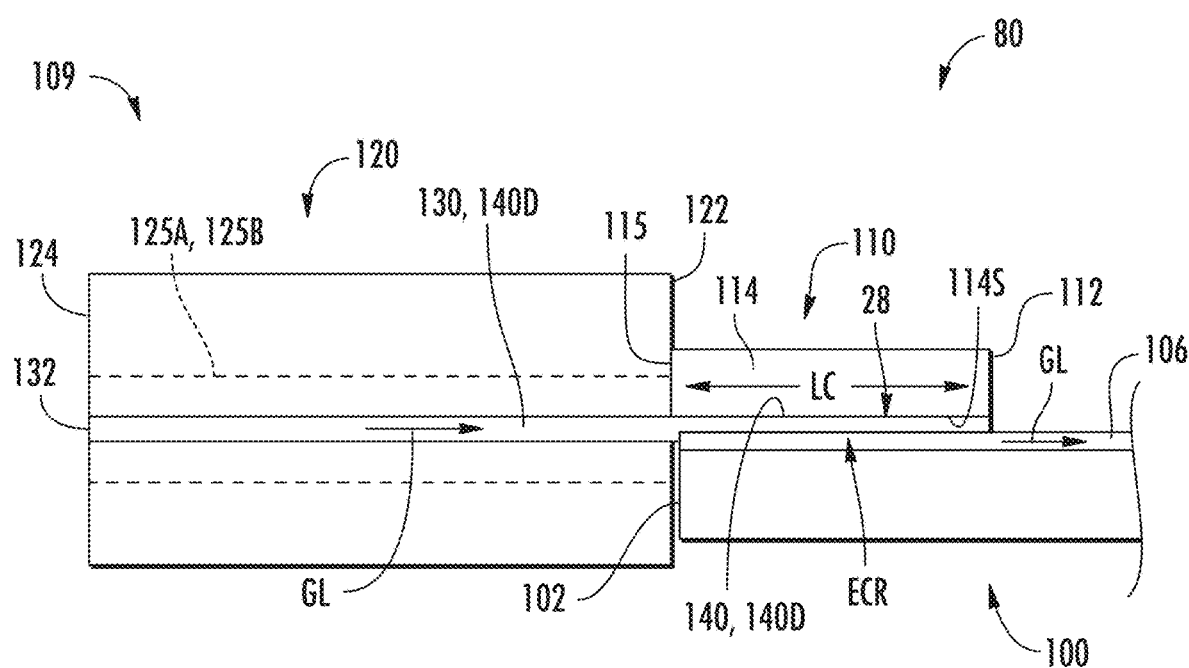
FIG. 14C is a close-up cross-sectional view of an embodiment of an optical assembly that shows how guided light can be evanescently optically coupled into the chip waveguides of an optical chip using the receptacle connector of FIG. 14B.

FIG. 14C is a close-up side view of an example optical assembly 80 that includes the waveguide support 110 of the receptacle connector of FIG. 14B operably disposed relative to the optical chip 100. The portion of the chip waveguide 106 and a portion of the select length of the transition waveguide 140 at the coupling surface 118 are in optical communication over an evanescent coupling region ECR over which evanescent coupling occurs. The evanescent coupling region ECR has a length LC selected to provide optimum evanescent coupling between the chip waveguide(s) and the transition waveguide(s). FIG. 14C shows guided light GL traveling in the ferrule waveguide 130 toward the optical chip 100. The guided light enters the transition waveguide 140 and is then evanescently coupled into the chip waveguide 106 via evanescent optical coupling within the evanescent coupling region ECR. This process can be carried out in the opposite direction, with the guided light GL starting in the chip waveguide 106 and coupling into the transition waveguide 140 and then traveling to the ferrule waveguide 130.

Figure 15A:
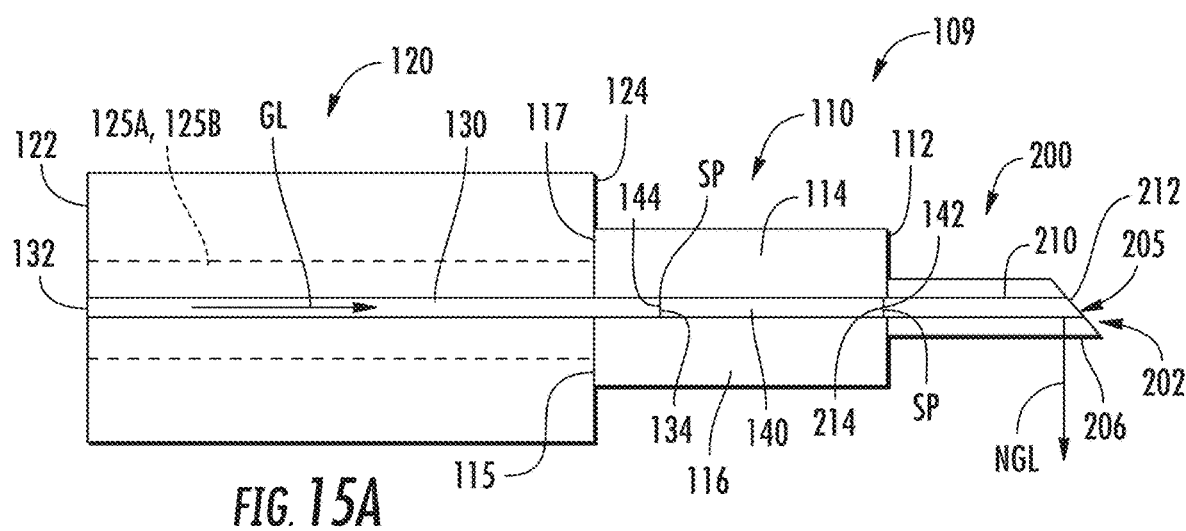
FIGS. 15A through 15D are close-up cross-sectional views of embodiments of receptacle connectors that include a light-turning feature.

FIGS. 15A through 15D are close-up cross-sectional views of example receptacle connectors 109 configured with an out-of-plane light-turning feature for redirecting the guided light GL at substantially a right angle to form non-guided light NGL. The example receptacle connectors 109 of FIGS. 15A through 15C include a light-turning component 200. In an example, the light-turning component has and end 202 and a bottom surface 206 that now defines a chip coupling surface. The light-turning component 200 is attached to the front end 112 of the waveguide support 110 and can include one or more turning-component waveguides 210 each having opposite end faces 212 and 214, as shown in the embodiment of FIG. 15A. In an example, the light-turning component 200 can comprise a PLC that supports the one or more turning-component waveguides 210, e.g., as ion-exchanged waveguides or polymer waveguides. The light-turning component 200 is configured to re-direct light out of the plane in which the ferrule waveguides reside.

Figure 15B:
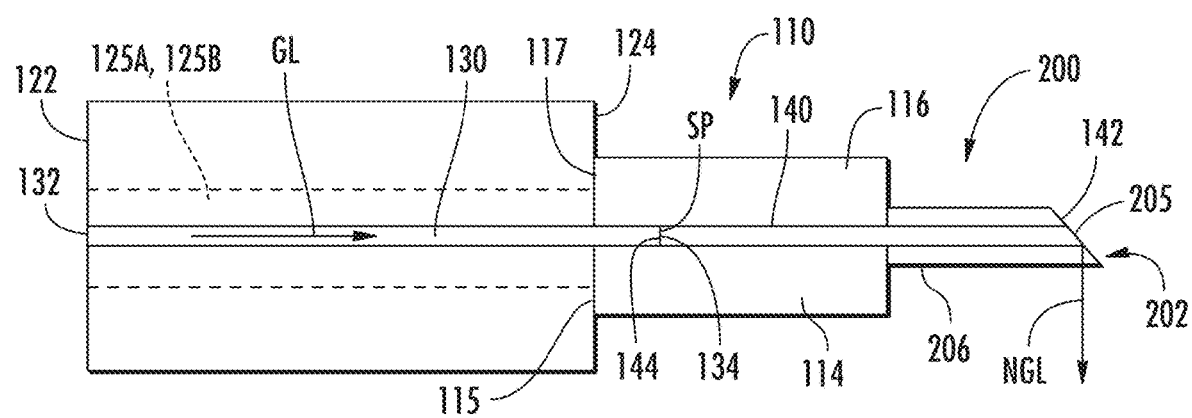
Figure 15C:
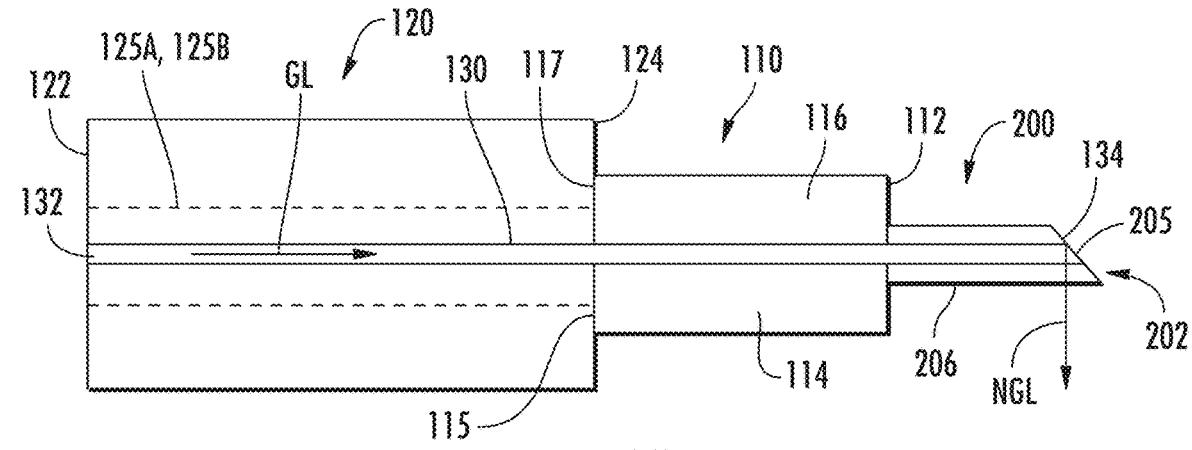

In this embodiment, the ends 214 of the turning-component waveguides 210 are spliced to the ends 144 of the transition waveguides 140 to define splice(s) SP. In the embodiment of FIG. 15B, the transition waveguides 140 extend through the light-turning component 200 to its end 202. In the embodiment of FIG. 15C, the ferrule waveguides 130 extend through the waveguide support 110 and through to the end 202 of the light-turning component 200. In this particular embodiment, there are no splices within the receptacle connector 109.

In the example of FIG. 15A, the first end 202 of the light-turning component 200 is angled at substantially 45° (relative to the vertical or y-direction) and defines an angled reflective surface 205. The angled reflective surface 205 can be formed on the polished end face(s) 212 of the turning-component waveguides 210 (FIG. 15A) or on the end face(s) 142 of the transition waveguides 140 (FIG. 15B) or the second end face(s) 134 of the ferrule waveguides 130 (FIG. 15C). In an example, the angled reflective surface 205 can also be defined as a separate reflective element that is in contact with the respective waveguide end faces or is spaced apart therefrom.

Figure 15D:
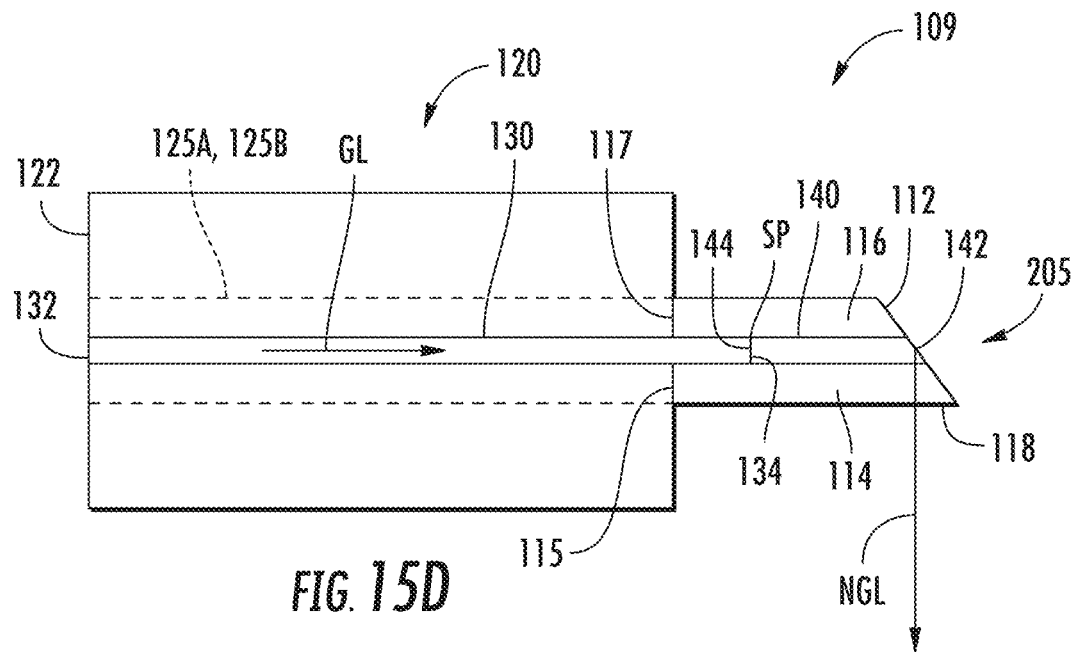

FIG. 15D is similar to FIG. 15B and shows an embodiment of the receptacle connector wherein there is no additional light-turning component 200 and the front end 112 of the waveguide support and the end faces 142 of the transition waveguides 140 are polished at a 45° angle to define the angle reflective surface(s) 205.

Figure 15E:
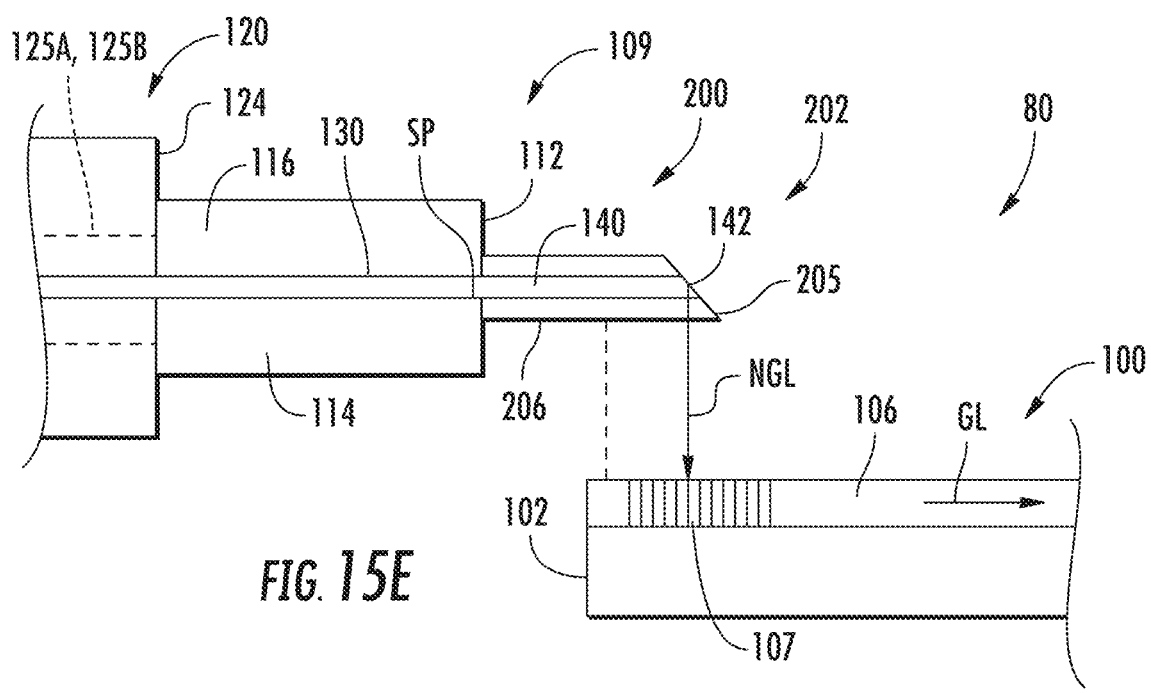
FIG. 15E is a partially exploded cross-sectional view of an example optical assembly illustrating how a receptacle connector with a light-turning feature is used to optically couple to a chip waveguide of an optical chip via a coupling grating FIG. 16 schematically depicts an isometric view of an example securing fixture for use with the example receptacle connector depicted in FIG. 9 according to one or more embodiments described and illustrated herein.

FIG. 15E is a close-up cross-sectional partially exploded view of an example optical assembly 80 that includes an example receptacle connector 109 similar to that of FIG. 15A but wherein the transition waveguide 140 is defined by the ferrule waveguide 130. The guided light GL is shown traveling in the ferrule waveguide 130 toward the optical chip 100. The guided light GL passes through to the turning-component waveguide 210 and is then incident upon the angled reflective surface 205. The angled reflective surface 205 re-directs the guided light (e.g., by total-internal reflection or by a silvered end face) to travel as non-guided light NGL towards the coupling grating 107 of the chip waveguide 106. The non-guided light NGL is then incident upon the coupling grating 107, which is configured to cause the non-guided light to couple into the chip waveguide 106 as guided light GL. In an example, the coupling grating 107 is placed in close proximity to the angled reflective surface so that the length of the optical path traveled by the non-guided light NGL is as small as possible.

Securing Fixture

Figure 16:
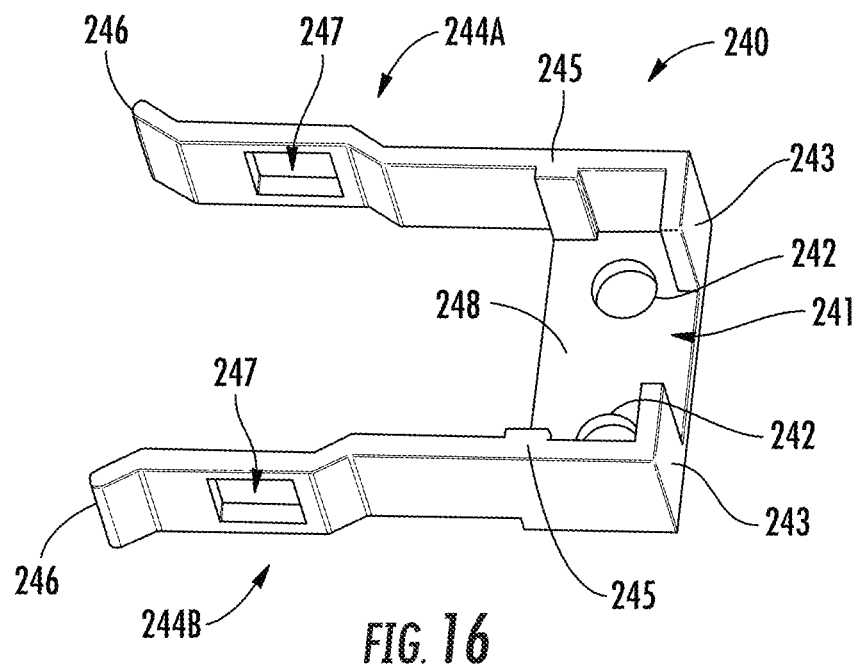
Figure 17:
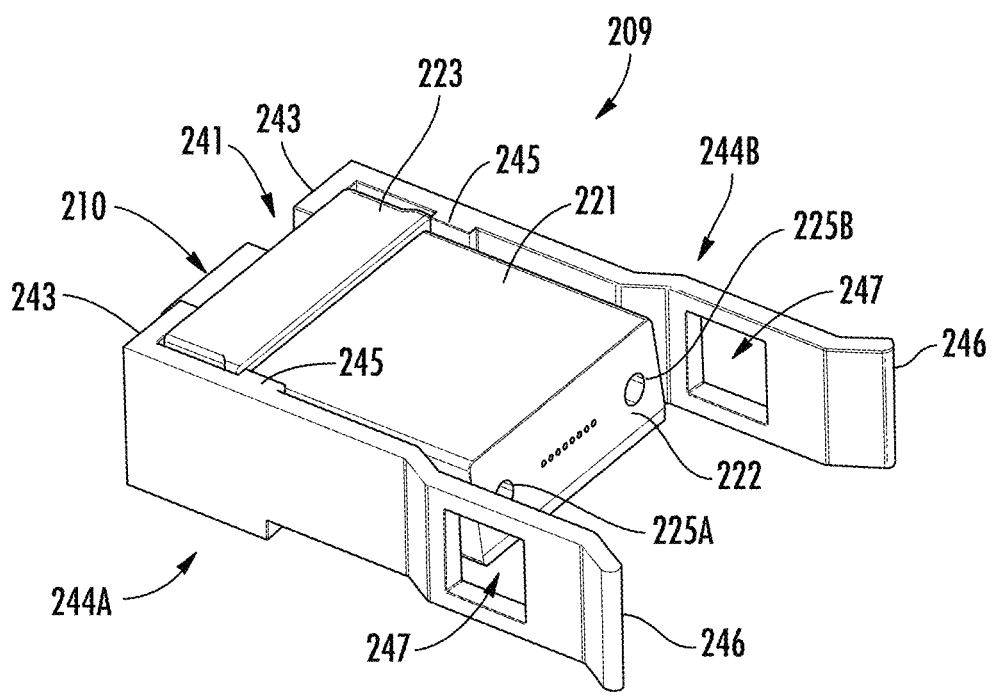
FIG. 17 schematically depicts an isometric view of the example receptacle connector depicted in FIG. 9 disposed within the securing fixture depicted in FIG. 17 according to one or more embodiments described and illustrated herein.

The receptacle connector 109 disclosed herein may further include a securing fixture for securing another cooperating optical connector for making an optical connection to form a connector assembly, as discussed below. FIGS. 16 and 17 schematically illustrate isometric views of an example securing fixture 240 configured to receive a suitable ferrule such as ferrule 120 or ferrule 120.

FIG. 16 illustrates the securing fixture 240. FIG. 17 illustrates the ferrule 120 disposed within the securing fixture 240 for securing an optical connection. Securing fixtures 240 may have any suitable configuration for receiving a ferrule to make an optical connection. Referring to both FIGS. 15 and 16, the securing fixture 240 of this embodiment generally comprises a seat 248, a wall 243 extending from the seat 248, a first arm 244A extending from the seat 248 and the wall 243, and a second arm 244B extending from the seat 248 and the wall 243. The securing fixture 240 may be formed from a thermally stable metal such as, without limitation, Invar or other suitable material. The securing fixture 240 may be formed by a stamping process or may be machined, for example.

The securing fixture 240 may include additional features for mounting to a substrate, such as a base substrate to which the optical chip 100 is mounted. As shown in FIG. 16, the seat 248 comprises two holes 242, which may be configured to mate with corresponding features of a base substrate (not shown) to which the securing fixture 240 is mounted. Other types of mechanical features may be provided on the securing fixture 240 for attachment to a base substrate, such as protruding pins operable to be inserted into corresponding holes of the base substrate.

The example securing fixture 240 includes a protrusion 245 extending from an inner surface of each of the first and second arms 244A, 244B. As shown in FIG. 16, the flange portion 223 of the ferrule 120 is disposed on the seat 248 such that the flange portion 223 is further positioned between the wall 243 and the protrusions 245. The flange portion 223 of the ferrule 120 may be coupled to the securing fixture 240 by an interference fit with the wall 243 and the protrusions 245. The ferrule 120 may also be bonded to the securing fixture 240 by a thermally stable adhesive, for example.

The wall 243 of the example securing fixture 240 includes a notch 241. As shown in FIG. 17, the waveguide support 110 is disposed within the notch 241 such that the waveguide support 110 protrudes beyond the wall 243.

The first and second arms 244A, 244B are configured to flex outwardly when a mated plug connector is inserted into the securing fixture 240, as described in more detail below. As shown in the example securing fixture 240 depicted in FIGS. 16 and 17, the first and second arms 244A, 244B may have a flared end 246 that flare outwardly away from the ferrule 120 to assist in guiding the mated plug connector toward the ferrule 120. The example first and second arms 244A, 244B each include an engagement feature configured as an opening 247 operable to receive a detent feature 257 of a corresponding mated plug connector 250 as described in more detail below. It should be understood that embodiments may include other engagement features for removably engaging a mated optical connector.

Plug Connector

The receptacle connectors 109 disclosed herein are configured to cooperate with plug connectors to form a connector assembly.

Figure 18:
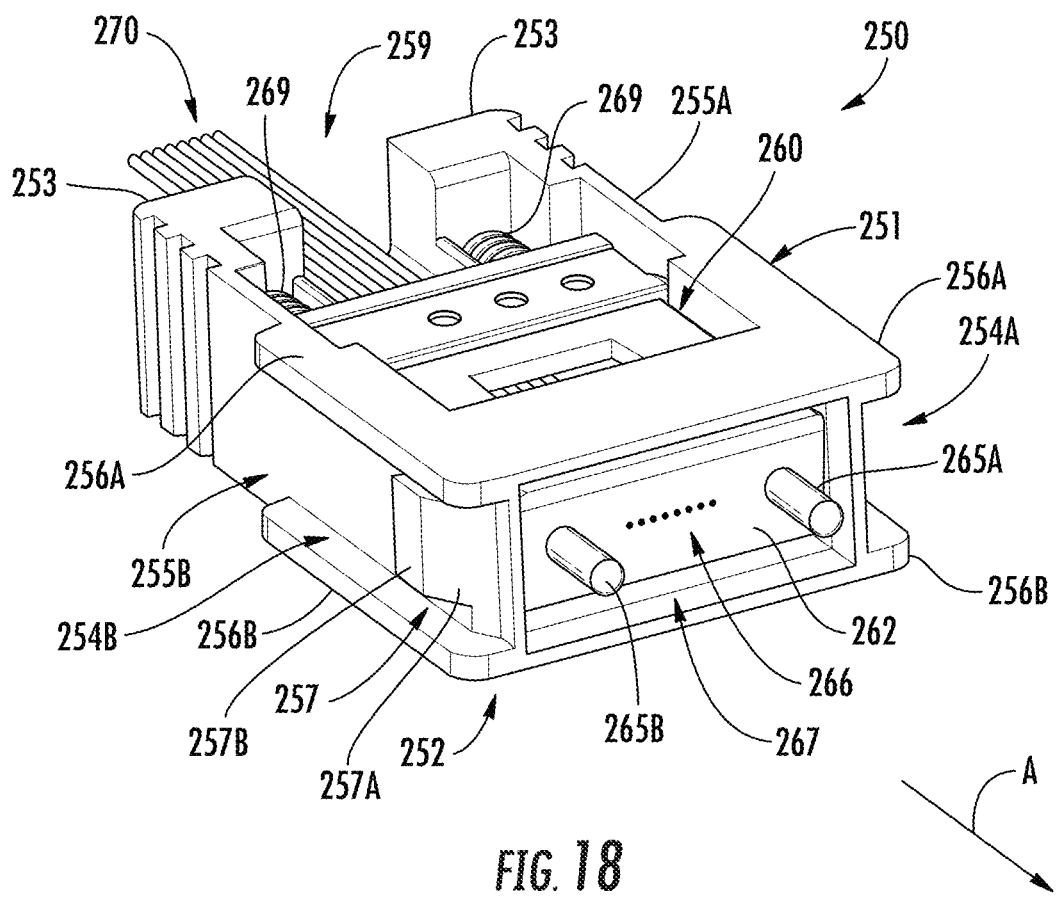
FIG. 18 schematically depicts an isometric view of an example plug connector operable to mate with the example receptacle connector that includes the securing fixture depicted in FIGS. 16 and 17 according to one or more embodiments described and illustrated herein.

FIG. 18 schematically depicts an example optical connector in the form of a plug connector 250 operable to be removably connected to the example receptacle connector 109 depicted in FIG. 17. It should be understood that the plug connector 250 depicted in FIG. 18 is for illustrative purposes only and that other configurations are also possible. Generally, the plug connector 250 comprises a plug connector body 251 and a plug ferrule 260 disposed within the plug connector body 251. The plug connector body 251 has a first side 255A and a second side 255B each having a detent feature 257 proximate a front end 252 of the plug connector body 251. The plug connector body 251 may further include first flanges 256A and second flanges 256B extending over the first side 255A and the second side 255B, thereby defining respective first and second channels 254A, 254B for receiving the first and second arms 244A, 244B of the securing fixture 240.

The detent feature 257 may have a slope portion 257A and a mesa portion 257B such that, as the plug connector 250 is inserted into the securing fixture 240, the slope portions 257A flex the first and second arms 244A, 244B outwardly until the mesa portion portions 257B are fully within the openings 247 of the first and second arms 244A, 244B, which causes the first and second arms 244A, 244B to snap back and lock the detent features 257 within the openings 247.

The plug connector 250 includes a plug ferrule 260, which should be compatible with the receptacle connector 109 such as using a plug ferrule similar to a MPO or MT ferrule as desired. The plug ferrule 260 comprises one or more plug bores 266 operable to receive one or more plug optical fibers 270 that terminate at a plug optical coupling face 262. The rear wall 253 of the plug connector body 251 may include a notch 259 or other opening to allow the one or more plug optical fibers 270 to enter the plug connector body 251. Each of the plug optical coupling face 262 and the first surface 122 of the ferrule 120 is correspondingly tilted in the illustrated embodiment to prevent back reflection of optical signals. The plug optical coupling face 262 is exposed by an opening 267 of the plug connector body 251. The example plug connector 250 further comprises a first alignment pin 265A and a second alignment pin 265A extending from the plug optical coupling face 262 that are configured to be inserted into the first alignment bore 125A and the second alignment bore 125B of the ferrule, respectively.

In the illustrated embodiment, the plug ferrule 260 is biased in a direction A toward the front end by one or more bias members 269 disposed between the rear wall 253 of the plug connector body 251 and the plug ferrule 260. The bias members 269 may be configured as springs, for example. Because the springs are compressed during connector mating, and the receptacle connector 109 is smaller than typical MTP/MPO connectors, the springs used should provide a lower force (e.g., about 4 N) than typically used in MTP/MPO connectors (e.g., about 10 N). The spring force should be minimized to just that needed to maintain physical contact in the operating temperature range of the optical assembly.

In another embodiment, an anti-reflection (AR) coating (not shown) can be applied to the plug optical coupling face 262 and a small gap (e.g., 5 microns or smaller) can be maintained between the plug connector 250 and the receptacle connector 109 when the two are mated.

Figure 19:
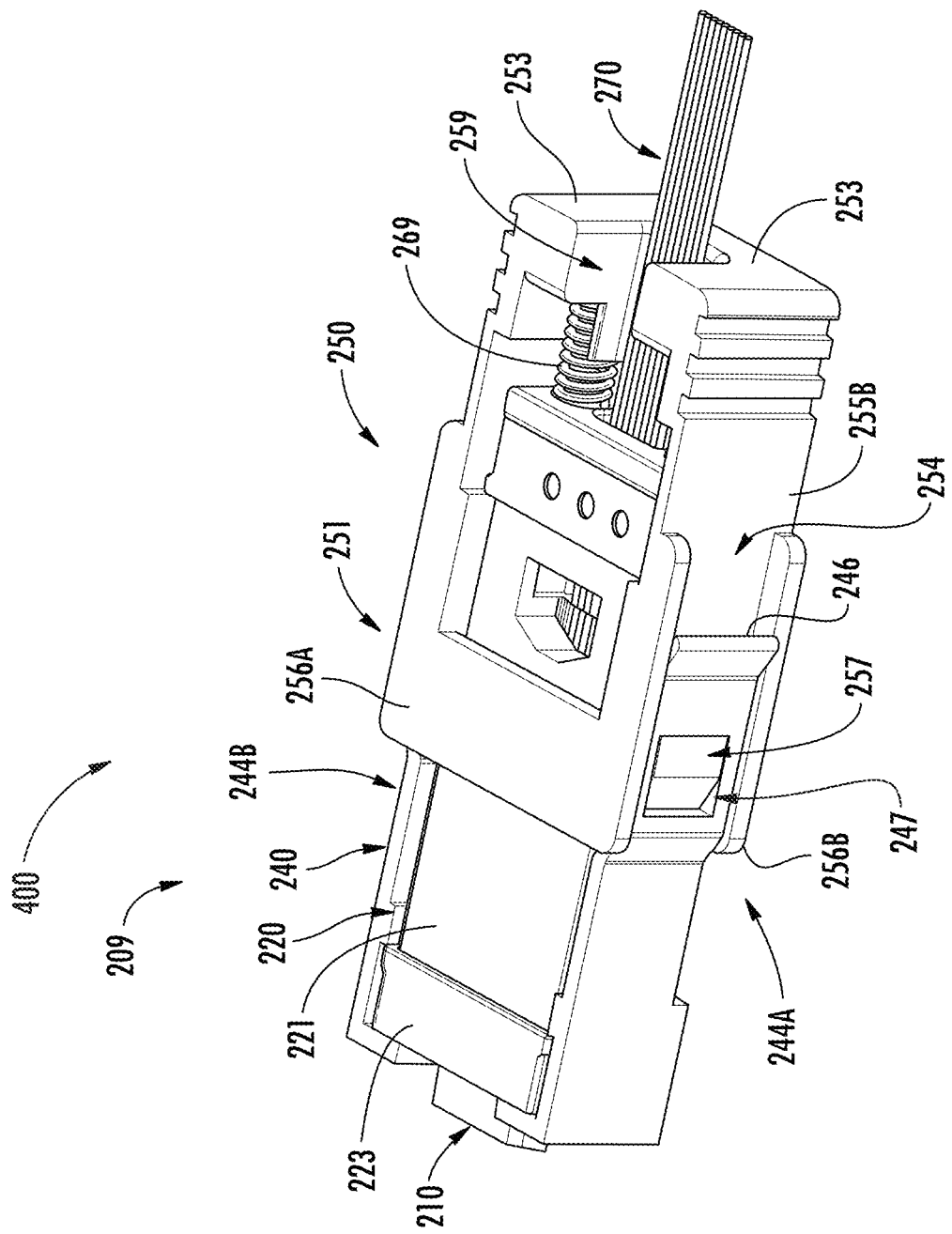
FIG. 19 schematically depicts an isometric view of the example plug connector depicted in FIG. 18 mated with the example receptacle connector with the securing fixture depicted in FIGS. 16 and 17 according to one or more embodiments described and illustrated herein to define an optical connector assembly.

FIG. 19 schematically illustrates a plug connector 250 mated to a receptacle connector 109 to define a connector assembly 400. The front end 252 of the plug connector 250 is brought between the first arm 244A and the second arm 244B of the securing fixture 240 such that the first arm 244A and the and the second arm 244B are disposed within channels 254 on the first and second sides 255A, 255B of the plug connector body 251 between the first and second flanges 256A, 256B. The detent features 257 of the plug connector body 251 cause the first and second arms 244A, 244B to flex outwardly until the detent features 257 clear the openings 247 of the first and second arms 244A, 244B. Pushing the plug connector 250 into the securing fixture 240 causes the bias members 269 to compress when the plug optical coupling face 262 of the plug ferrule 260 contacts the first surface 122 of the ferrule 120.

The plug ferrule 260 is allowed to float in the plug connector body 251 so that the ferrule-to-ferrule mating is not biased by the mechanical alignment of the plug connector 250 and the receptacle connector 109 including the securing fixture 240, beyond what is needed for coarse alignment. The final alignment between the plug ferrule 260 and the ferrule 120 of the receptacle connector 109 is provided by the first and second alignment pins 265A, 265B. However, both ferrules should be coarsely aligned prior to the first and second alignment pins 265A, 265B engaging the ferrule 120 of the receptacle connector 109 including the securing fixture 240 to prevent the first and second alignment pins 265A, 265B from contacting the first surface 122 of the ferrule 120 and causing damage. In the design illustrated in FIGS. 15-18, the first and second flanges 256A, 256B pre-align the plug connector 250 and receptacle connector 109. It is noted that the engagement length of the first and second arms 244A, 244B and the first and second flanges 356A, 256B enhance the connection's resistance to angular motion in the vertical plane.

Plug connector 250 removal is provided by flexing the first and second arms 244A, 244B of the securing fixture 240 and pulling back on the plug connector 250 away from the securing fixture 240. Plug connector 250 removal may be assisted by a removal tool (not shown).

The embodiments described herein enable repeatable connection of optical fibers to an optical chip configured as or otherwise comprising a light wave circuit. The receptacle connectors described herein may be directly bonded to a surface of an optical chip, such as those used in silicon photonics communications applications, and also be configured to withstand elevated temperatures of a solder reflow process or a thermo-compression bonding process. After the solder reflow process, optical fibers of a plug connector may be repeatedly connected and disconnected as needed, such as to make different connections within a data center. Because the receptacle connector can withstanding the solder reflow process, it may be fully tested prior to final assembly. Of course, the concepts may be used in other applications as well.

In an embodiment, the CTE of the components of receptacle connector (e.g., the ferrule and the waveguide support) substantially matches within a range the CTE of the material of the optical chip and/or active optical chip to reduce or inhibit stress at the joined interface between the receptacle connector and the optical chip due to thermal changes. Additionally, the edge of the optical chip to which the receptacle connector is bonded is mechanically protected by receptacle connector.

The ferrule of the receptacle connector provides a connection interface providing a relatively low loss. By way of example, an insertion loss of 0.5 dB or less may be possible, and the insertion loss may even be lower such as 0.25 dB or less for an angled connection interface. Further, there is a low loss interface between the receptacle connector and the optical chip because of an index matching interface and active alignment process. The total coupling loss provided by both interfaces may be less than 1 dB, and in some embodiments the total coupling loss is 0.5 dB or less. The alignment process may be active or passive depending on optical chip design and fabrication. The plug connector may be connected to the receptacle connector of the optical chip of the optical assembly before or after the optical assembly is packaged into a larger optical communications module (e.g., a multi-chip optical communications module or a silicon photonics module).

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. An optical connector comprising:
   a ferrule comprising a first surface and a plurality of bores extending from the first surface;
   a waveguide support coupled to the ferrule, the waveguide support comprising a chip coupling surface;
   a plurality of first waveguides disposed within the plurality of bores of the ferrule and each having a first end and a second end opposite the first end, wherein the first ends of the plurality of first waveguides are exposed at the first surface of the ferrule and define a first pitch; and
   a plurality of second waveguides at least partially supported by the waveguide support, the plurality of second waveguides each having a first end and a second end opposite the first end, wherein the second ends of the plurality of second waveguides are optically coupled to the second ends of the plurality of first waveguides, wherein the first ends of the plurality of second waveguides are exposed at the chip coupling surface of the waveguide support and define a second pitch that is the same as or smaller than the first pitch, wherein the second ends of the plurality of second waveguides are respectively optically coupled to the second ends of the plurality of first waveguides by respective splices.

2. The optical connector according to claim 1, wherein the first pitch is about 250 microns and the second pitch is between about 25 microns to about 127 microns.

3. The optical connector according to claim 1, wherein each of the plurality of first waveguides has a first mode-field diameter (MFD), each of the plurality of second waveguides has second MFD, and wherein the second MFD is smaller than the first MFD.

4. The optical connector according to claim 3, wherein the second MFD is between 25% and 75% of the first MFD.

5. The optical connector according to claim 3, wherein the second MFD is between 25% and 50% of the first MFD.

6. The optical connector according to claim 1, wherein each of the plurality of first waveguides has a first mode-field diameter (MFD), each of the plurality of second waveguides has second MFD, and wherein the second MFD is larger than the first MFD.

7. The optical connector according to claim 6, wherein the second MFD is between 5% and 25% larger than the first MFD.

8. The optical connector according to claim 1, wherein the plurality of first waveguides includes a fan-in region.

9. The optical connector according to claim 1, wherein the plurality of first waveguides reside in a first plane and wherein the waveguide support is configured to provide the plurality of second waveguides with an out-of-plane bend relative to the first plane.

10. The optical connector according to claim 1, wherein the splices reside within the waveguide support.

11. The optical connector according to claim 1, wherein the splices reside within the ferrule.

12. The optical connector according to claim 1, wherein the waveguide support is attached to the ferrule using an adhesive, and wherein the splices reside within the adhesive.

13. The optical connector according to claim 1, wherein the waveguide support comprises a support portion that includes grooves, and wherein each of the plurality of second waveguides at least partially resides in the grooves.

14. The optical connector according to claim 1, wherein the ferrule comprises either at least one alignment bore to define the optical connector as a receptacle connector or at least one alignment pin to define the optical connector as a plug connector.

15. The optical connector according to claim 1, wherein the plurality of second waveguides comprises exposed-core optical fibers.

16. The optical connector according to claim 1, wherein the plurality of second waveguides comprises exposed-core optical fibers.

17. An optical assembly comprising:
an optical chip comprising a surface, an edge, and a plurality of chip waveguides proximate the surface and terminating at the edge; and
an optical connector comprising:
a ferrule comprising a first surface and a plurality of bores extending from the first surface;
a waveguide support coupled to the ferrule, the waveguide support comprising a chip coupling surface;
a plurality of first waveguides respectively disposed within the plurality of bores such that first ends of the plurality of first waveguides are exposed at the first surface of the ferrule;
a plurality of second waveguides at least partially supported by the waveguide support and respectively optically coupled to the plurality of first waveguides, with ends of the plurality of the second waveguides exposed at the chip coupling surface of the waveguide support, wherein the second ends of the plurality of second waveguides are respectively optically coupled to the second ends of the plurality of first waveguides by respective splices; and
wherein the chip coupling surface of the waveguide support is disposed relative to the optical chip such that the plurality of second waveguides are optically coupled to the plurality of chip waveguides.

18. The optical assembly according to claim 17, wherein the chip coupling surface of the waveguide support is disposed adjacent the edge of the optical chip to establish edge coupling between the plurality of second waveguides and the plurality of chip waveguides.

19. The optical assembly according to claim 17, wherein portions of the plurality of second waveguides are disposed in close proximity to portions of the plurality of chip waveguides to define an evanescent coupling region over which evanescent coupling occurs between the plurality of second waveguides and the plurality of chip waveguides.

20. The optical assembly according to claim 19, wherein the plurality of second waveguides comprises exposed-core optical fibers.

* * * * *